US011933627B2

(12) United States Patent
Deng et al.

(10) Patent No.: US 11,933,627 B2
(45) Date of Patent: Mar. 19, 2024

(54) HIGH-DEFINITION MAP BUILDING METHOD AND APPARATUS

(71) Applicant: Huawei Technologies Co., Ltd., Shenzhen (CN)

(72) Inventors: Jiong Deng, Shenzhen (CN); Jun Wang, Shanghai (CN); Jingwei Zhou, Shanghai (CN); Chenguang Chen, Shanghai (CN); Zuqi Liu, Shenzhen (CN); Yulong Luo, Shanghai (CN); Jie Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/334,076

(22) Filed: May 28, 2021

(65) Prior Publication Data
US 2021/0293564 A1    Sep. 23, 2021

Related U.S. Application Data

(63) Continuation of application No. PCT/CN2019/113905, filed on Oct. 29, 2019.

(30) Foreign Application Priority Data

Nov. 29, 2018  (CN) .......................... 201811445283.5

(51) Int. Cl.
G01C 21/36     (2006.01)
G01C 21/00     (2006.01)

(52) U.S. Cl.
CPC ........ *G01C 21/367* (2013.01); *G01C 21/3811* (2020.08); *G01C 21/3815* (2020.08); *G01C 21/3874* (2020.08); *G01C 21/3878* (2020.08)

(58) Field of Classification Search
None
See application file for complete search history.

(56) References Cited

U.S. PATENT DOCUMENTS 5,859,700 A    1/1999 Yang
6,166,748 A    12/2000 Van Hook et al.
(Continued)

FOREIGN PATENT DOCUMENTS

CN    1467692 A    1/2004
CN    1504871 A    6/2004
(Continued)

OTHER PUBLICATIONS

Seif H. G. and et al. "Autonomous driving in the iCity-HD maps as a key challenge of the automotive industry", Engineering 2 (2016) 159-162 (Year: 2016).*
(Continued)

*Primary Examiner* — Hongye Liang
(74) *Attorney, Agent, or Firm* — Conley Rose, P.C.

(57)    ABSTRACT

A high-definition map building method includes determining a key node describing information about a key position of a lane attribute change, determining a key node layer based on a position of the key node and an attribute of the key node, and determining a high-definition map based on a navigation map and the key node layer. The navigation map provides road-level navigation information, and the high-definition map provides lane-level navigation information.

20 Claims, 19 Drawing Sheets

(56) References Cited

U.S. PATENT DOCUMENTS

| | | | |
|---|---|---|---|
| 6,537,751 B1 | 3/2003 | Cohen et al. | |
| 6,577,334 B1* | 6/2003 | Kawai | G05D 1/0278 |
| | | | 348/148 |
| 6,898,516 B2 | 5/2005 | Pechatnikov et al. | |
| 8,428,876 B2 | 4/2013 | Lee | |
| 9,341,485 B1 | 5/2016 | Weiland et al. | |
| 9,665,100 B2 | 5/2017 | Shashua et al. | |
| 2002/0091758 A1 | 7/2002 | Singh et al. | |
| 2004/0233101 A1* | 11/2004 | Kim | G01C 21/3682 |
| | | | 342/357.31 |
| 2006/0184645 A1 | 8/2006 | Monette et al. | |
| 2007/0035635 A1 | 2/2007 | Misawa | |
| 2007/0055443 A1 | 3/2007 | Sumizawa et al. | |
| 2007/0294643 A1 | 12/2007 | Kyle | |
| 2008/0319641 A1 | 12/2008 | Mutoh et al. | |
| 2010/0161192 A1 | 6/2010 | Nara et al. | |
| 2010/0179756 A1 | 7/2010 | Higgins et al. | |
| 2011/0287801 A1 | 11/2011 | Levin et al. | |
| 2015/0379359 A1 | 12/2015 | Han et al. | |
| 2016/0098496 A1 | 4/2016 | Joshi et al. | |
| 2016/0272203 A1 | 9/2016 | Otake et al. | |
| 2016/0314358 A1* | 10/2016 | Kushida | G06V 20/588 |
| 2018/0149488 A1* | 5/2018 | Suto | G01C 21/3658 |
| 2020/0219000 A1 | 7/2020 | Wen et al. | |
| 2020/0256698 A1 | 8/2020 | Shi et al. | |
| 2021/0103759 A1 | 4/2021 | Chai et al. | |

FOREIGN PATENT DOCUMENTS

| | | |
|---|---|---|
| CN | 102222363 A | 10/2011 |
| CN | 104535070 A | 4/2015 |
| CN | 104573733 A | 4/2015 |
| CN | 105043403 A | 11/2015 |
| CN | 105197014 A | 12/2015 |
| CN | 105206090 A | 12/2015 |
| CN | 105651295 A | 6/2016 |
| CN | 105788274 A | 7/2016 |
| CN | 105984464 A | 10/2016 |
| CN | 106156267 A | 11/2016 |
| CN | 106886604 A | 6/2017 |
| CN | 107193888 A | 9/2017 |
| CN | 108088448 A | 5/2018 |
| CN | 108830018 A | 11/2018 |
| CN | 109542093 A | 3/2019 |
| CN | 109752009 A | 5/2019 |
| CN | 110688500 A | 1/2020 |
| CN | 111198389 A | 5/2020 |
| DE | 102015116882 A1 | 4/2016 |
| IN | 101436074 A | 5/2009 |
| JP | 2007071581 A | 3/2007 |
| JP | 2011149977 A | 8/2011 |
| JP | 2016075905 A | 5/2016 |
| JP | 2016206868 A | 12/2016 |
| JP | 2018146468 A | 9/2018 |

OTHER PUBLICATIONS

Chaoran Liu, et al. "Lane-Level Route Planning Based on a Multi-Layer Map Model", 2017, IEEE 20th International Conference on Intelligent Transportation Systems (ITSC) (Year: 2017).*

* cited by examiner

HIGH-DEFINITION MAP BUILDING METHOD AND APPARATUS

CROSS-REFERENCE TO RELATED APPLICATIONS

This application is a continuation of International Patent Application No. PCT/CN2019/113905 filed on Oct. 29, 2019, which claims priority to Chinese Patent Application No. 201811445283.5 filed on Nov. 29, 2018. The disclosures of the aforementioned applications are hereby incorporated by reference in their entireties.

TECHNICAL FIELD

Embodiments of this application relate to the field of intelligent transportation technologies, and in particular, to a high-definition map building method and apparatus.

BACKGROUND

With an increasing quantity of vehicles in cities, traffic is increasingly heavy. To accommodate the increasing traffic, a design of an urban road is increasingly complex. A common navigation map can meet a simple navigation requirement of a user during driving, but based on refined road information, a high-definition map can provide an early warning or implement traffic services such as automatic driving.

The high-definition map has higher requirements on information richness and definition. The high-definition map provides more road details, it can provide geographic coordinate information of each lane on a road, and can reach centimeter-level definition. The high-definition map can record abundant road sign information, such as pedestrian crosswalks, flyovers, and traffic lights. In an intersection area, the high-definition map also generates a plurality of lane-level virtual lane lines based on an actual road scenario, to provide accurate and smooth navigation information for a vehicle to travel at the intersection.

However, costs of producing the high-definition map are currently rather high. A volume of navigation map data could be 1 kilobyte (kB) per kilometer (km), while a volume of high-definition map data could be 100 megabytes (NB) per km. A data volume difference is 100,000 times. Therefore, a data volume of the high-definition map is relatively large that may reach a terabyte (TB) level or higher. This affects loading and usage efficiency of the high-definition map.

SUMMARY

Embodiments of this application provide a high-definition map building method and apparatus, to improve use efficiency of a high-definition map.

Technical solutions provided in the embodiments of this application are as follows.

According to a first aspect, a high-definition map building method is provided. The method may be performed by a vehicle, or may be performed by a cloud server. Steps of the method include determining a key node, where the key node is used to describe information about a key position of a lane attribute change, determining a key node layer based on a position of the key node and an attribute of the key node, and determining a high-definition map based on a navigation map and the key node layer. The navigation map is used to provide road-level navigation information, and the high-definition map is used to provide lane-level navigation information. In this way, compared with an existing high-definition map, the high-definition map provided in this application greatly reduces complexity of the map, and helps reduce a data volume of the high-definition map and costs of making the high-definition map. This helps improve a map loading speed and use efficiency while ensuring precision.

In a possible design, a type of the key node includes one or more of the following: lane start and end points, a lane change point, or exclusive right-turn lane start and end points. The key node in this application is not limited to these types, and the foregoing is merely an example of the type of the key node. These types of key node can indicate key positions of some key driving scenarios, to improve precision of the map provided in this application.

In a possible design, the lane change point includes one or more of the following: a fork point generated when a quantity of lanes increases, a convergence point generated when the quantity of lanes decreases, a fork junction of an exit lane of a highway, and a convergence point of an entrance lane of the highway. Some examples of the lane change point are given in this design.

In a possible design, if a lane width change occurs in N consecutive frames in frames shot by a vehicle-mounted camera, and N is greater than a first predefined threshold, it is determined that the key node exists in the N frames of image. A geographic coordinate of the key node is determined. The geographic coordinate of the key node is the position of the key node.

In a possible design, in an initial frame in the N frames, a lane width with the lane width change is less than a second predefined threshold. Alternatively, in an end frame in the N frames, the lane width with the lane width change is less than a third predefined threshold. For example, the second predefined threshold and the third predefined threshold are the same. Both the second predefined threshold and the third predefined threshold are one meter. In this way, a frame may be filtered.

In a possible design, the method further includes determining a first change value and a second change value for any frame in the N frames, and if a larger value between the first change value and the second change value is greater than a fourth predefined threshold, determining that the lane width change occurs in the any frame. The first change value is an absolute value of a difference between a first lane width at a first pixel in the any frame and a second lane width at a second pixel in the any frame. The second change value is an absolute value of a difference between the first lane width at the first pixel in the any frame and a third lane width at a first pixel in a previous frame of the any frame. Alternatively, either the first change value and the second change value may be compared with the fourth predefined threshold, to determine that the lane width change occurs in the any frame. That either the first change value and the second change value may be compared with the fourth predefined threshold, to determine that the lane width change occurs in the any frame can roughly select the N frames in a repeated checking manner.

In a possible design, the attribute of the key node includes one or more of the following: an identifier (ID) of the key node, an ID of a mesh to which the key node is mapped in the navigation map, an ID of a road to which the key node is mapped in the navigation map, a number of a lane in which the key node is located, or a type of the key node.

In a possible design, a key node that has a mapping relationship with a road on which the vehicle currently travels is determined based on the high-definition map. The vehicle travels based on the key node and a route planning intention. A traveling vehicle is navigated based on the high-definition map designed in this embodiment of this application, and can travel in the middle of the road based on a conventional navigation map layer. Compared with the existing high-definition map, this avoids a complex and redundant navigation operation. Detailed navigation solutions are provided for a lane change scenario and an intersection scenario. The solutions are easy to operate and highly feasible, and have low requirements on positioning. Lane-level navigation precision can be provided to meet a requirement of automatic driving.

In a possible design, the key node includes a first key node. That the vehicle travels based on the key node and a route planning intention is implemented in the manner of determining a projected point from the first key node to the road, and traveling along a road route based on a distance between a traveling position of the vehicle and the projected point and based on the road-level navigation information provided by the navigation map. A vehicle positioning requirement is broken down. Global positioning is used in an S direction, and relative positioning is used in a T direction. The global positioning is coupled with the relative positioning. This helps reduce a requirement on an automatic driving positioning system.

In a possible design, the key node further includes a second key node. That the vehicle travels based on the key node and a route planning intention is implemented in the manner of, when the traveling position of the vehicle reaches the projected point, changing a lane based on the route planning intention, and traveling based on a distance between the traveling position of the vehicle and the second key node. The vehicle positioning requirement is broken down. The global positioning is used in the S direction, and the relative positioning is used in the T direction. The global positioning is coupled with the relative positioning. This helps reduce the requirement on the automatic driving positioning system.

In a possible design, the key node further includes a third key node. That the vehicle travels based on the key node and a route planning intention is implemented in the manner of, when it is determined that the traveling position of the vehicle reaches the second key node, passing through an intersection based on the route planning intention and a virtual lane line. The virtual lane line is determined by the second key node and the third key node.

According to a second aspect, a high-definition map application method is provided. The method may be performed by a vehicle. The method is mainly implemented by performing the following steps of determining, based on the high-definition map, a key node that has a mapping relationship with a road on which the vehicle currently travels, where the high-definition map includes a navigation map and a key node layer, the navigation map is used to provide road-level navigation information, and the key node layer includes a position of the key node and an attribute of the key node, and traveling based on the key node and a route planning intention. This can improve a loading speed and use efficiency of the high-definition map, and facilitates application of the high-definition map in automatic driving.

In a possible design, the key node includes a first key node. The traveling based on the key node and a route planning intention is implemented in the manner of determining a projected point from the first key node to the road, and traveling along a road route based on a distance between a traveling position of the vehicle and the projected point and based on the road-level navigation information provided by the navigation map. A vehicle positioning requirement is broken down. Global positioning is used in an S direction, and relative positioning is used in a T direction. The global positioning is coupled with the relative positioning. This helps reduce a requirement on an automatic driving positioning system.

In a possible design, the key node further includes a second key node. The traveling based on the key node and a route planning intention is implemented in the manner of, when the traveling position of the vehicle reaches the projected point, changing a lane based on the route planning intention, and traveling based on a distance between the traveling position of the vehicle and the second key node. The vehicle positioning requirement is broken down. The global positioning is used in the S direction, and the relative positioning is used in the T direction. The global positioning is coupled with the relative positioning. This helps reduce the requirement on the automatic driving positioning system.

In a possible design, the key node further includes a third key node. The traveling based on the key node and a route planning intention is implemented in the manner of, when it is determined that the traveling position of the vehicle reaches the second key node, passing through an intersection based on the route planning intention and a virtual lane line. The virtual lane line is determined by the second key node and the third key node.

According to a third aspect, a high-definition map building apparatus is provided. The apparatus has a function of implementing any one of the first aspect or the possible designs of the first aspect. The function may be implemented by hardware, or may be implemented by hardware executing corresponding software. The hardware or the software includes one or more modules corresponding to the foregoing function.

In one embodiment, the high-definition map building apparatus may be a chip or an integrated circuit.

In a possible design, when a part or all of the function is implemented by the software, the high-definition map building apparatus includes a processor configured to execute a program. When the program is executed, the high-definition map building apparatus may implement the method in any one of the first aspect or the possible designs of the first aspect. In one embodiment, a memory is further included, and is configured to store the program executed by the processor.

In one embodiment, the memory may be a physically independent unit, or may be integrated with the processor.

In a possible design, when the part or all of the function is implemented by the software, the high-definition map building apparatus includes the processor. The memory configured to store the program is located outside the high-definition map building apparatus. The processor is connected to the memory through a circuit/an electric wire, and is configured to read and execute the program stored in the memory.

According to a fourth aspect, a high-definition map application apparatus is provided. The apparatus has a function of implementing any one of the second aspect or the possible designs of the second aspect. The function may be implemented by hardware, or may be implemented by hardware executing corresponding software. The hardware or the software includes one or more modules corresponding to the foregoing function. The high-definition map application apparatus may also be referred to as a high-definition map building apparatus, refer to a description of the high-definition map application apparatus in one embodiment of the specification.

In one embodiment, the high-definition map application apparatus may be a chip or an integrated circuit.

In a possible design, when a part or all of the function is implemented by the software, the high-definition map application apparatus includes a processor configured to execute a program. When the program is executed, the high-definition map application apparatus may implement the method in any one of the second aspect or the possible designs of the second aspect. In one embodiment, a memory is further included, and is configured to store the program executed by the processor.

In one embodiment, the memory may be a physically independent unit, or may be integrated with the processor.

In a possible design, when the part or all of the function is implemented by the software, the high-definition map application apparatus includes the processor. The memory configured to store the program is located outside the high-definition map application apparatus. The processor is connected to the memory through a circuit/an electric wire, and is configured to read and execute the program stored in the memory.

According to a fifth aspect, a computer storage medium is provided. The computer storage medium stores a computer program. The computer program includes an instruction used to perform the method in the foregoing aspects.

According to a sixth aspect, a computer program product including an instruction is provided. When the computer program product is run on a computer, the computer is enabled to perform the method in the foregoing aspects.

DESCRIPTION OF EMBODIMENTS

The following describes embodiments of this application in detail with reference to accompanying drawings.

A high-definition map building and application method provided in the embodiments of this application may be applied to an intelligent transportation system. A vehicle in the intelligent transportation system can use the high-definition map to implement traffic services. The traffic services in the embodiments of this application may be various automatic driving and assisted driving services, for example, route planning and providing a driving risk warning for manual driving. The foregoing traffic services are merely an example. The high-definition map building and application method provided in the embodiments of this application provides technical preparation for fast service rollout and continuous update of vehicle to another apparatus (V2X) communication. For example, the V2X is vehicle to vehicle (V2V) communication or vehicle to installation (V2I) communication.

The following describes the high-definition map building and application method provided in the embodiments of this application in detail.

Figure 1:
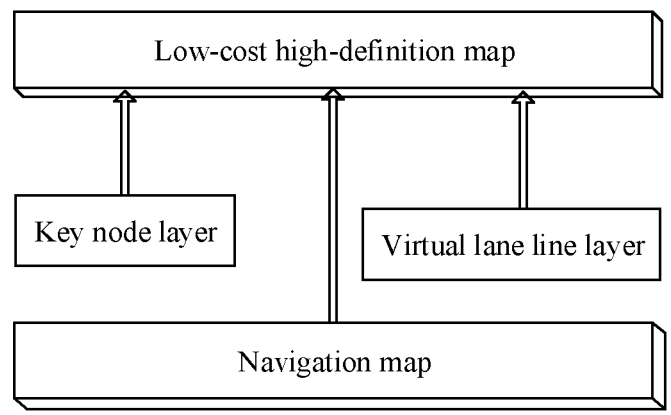
FIG. 1 is a schematic diagram of an architecture of a high-definition map according to an embodiment of this application.

As shown in FIG. 1, a high-definition map designed in this embodiment of this application is a high-definition map that is with relatively low costs and relatively low complexity and that is built by adding a key node layer to a conventional navigation map. To further improve definition of the map, a virtual lane line (virtual lane) layer may be further added to the navigation map.

Figure 2A:
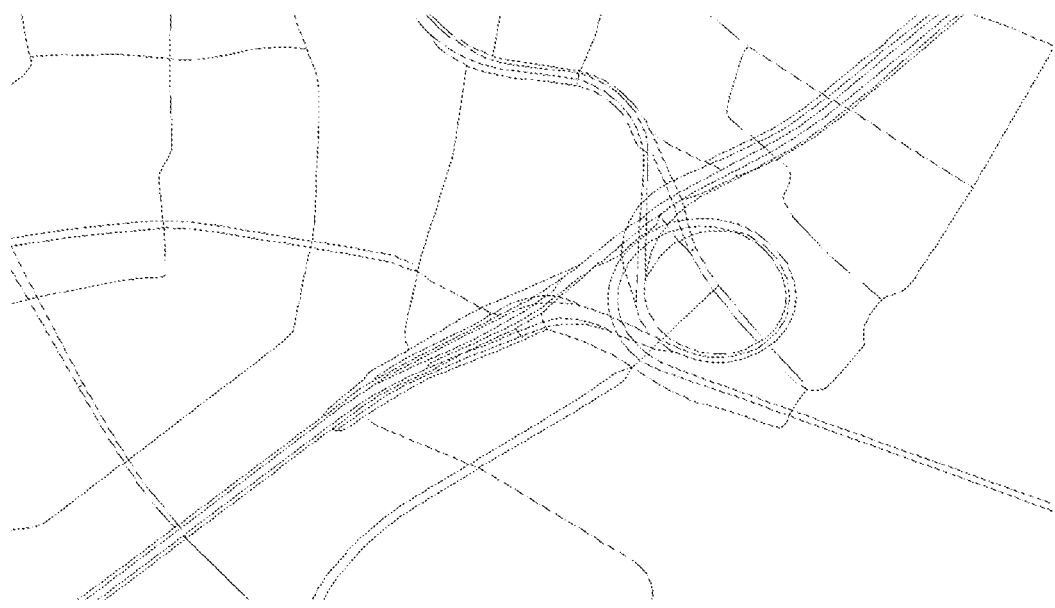
FIG. 2A is a schematic diagram of a conventional navigation map in the other approaches.

FIG. 2A is a schematic diagram of a conventional navigation map. A navigation map is the conventional navigation map. Compared with a high-definition map, the conventional navigation map can provide only road-level navigation information. The navigation map may provide navigation information for a user, to meet a navigation requirement of a driving route. For example, the navigation map may provide the navigation information such as a quantity of lanes on a current road, speed limiting information, turning information, and route planning.

A key node is a node used to describe key road information, or is information used to describe a key position of a lane attribute change, for example, information in a relatively critical scenario for automatic driving. Usually, the key node exists in an intersection or a lane change scenario. A type of the key node may include but is not limited to any one or more of the following: lane start and end points, a lane change point, or exclusive right-turn lane start and end points. The lane start and end points include a lane start point and a lane end point. The lane start and end points include start points and end points of several lane lines on a road. The lane start point is a point on a lane start line, and the lane end point is a point on a lane stop line. Usually, in actual application, the lane start line and a reverse lane stop line are in a same straight line. The lane change point may be a fork point generated by adding a turning lane when some roads are close to an intersection, may be a convergence point generated by reducing one lane when a new road is entered through the intersection, or may be a fork junction of an exit lane of a highway/viaduct or a convergence point of an entrance lane of the highway/viaduct. In conclusion, the lane change point may include but is not limited to any one or more of the following: the fork point generated when a quantity of lanes increases, the convergence point generated when the quantity of lanes decreases, the fork junction of the exit lane of the highway (and/or the viaduct), and the convergence point of the entrance lane of the highway (and/or the viaduct). The exclusive right-turn lane start and end points include a start intersection point and an end intersection point that are of a lane line (or an extension line of the lane line) of the exclusive right-turn lane and two lane lines that are connected to the exclusive right-turn lane. It should be noted that a meaning of the key node may be extended to a lane information change point in any working condition. Examples of the type of the key node are merely an example. The type of the key node may further include another type, or may be another type. This is not limited in this application.

Figure 2B:
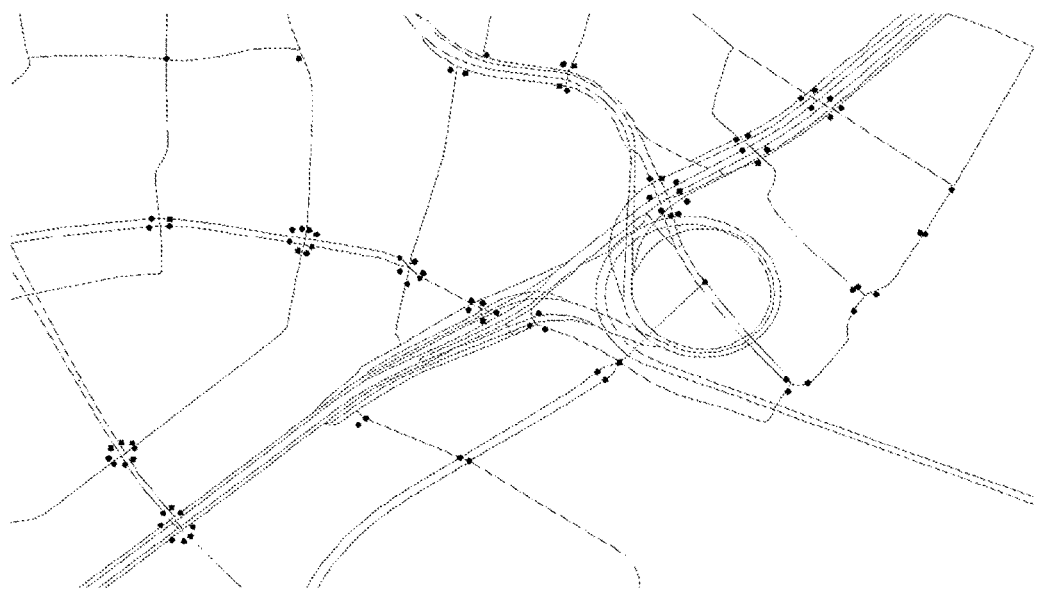
FIG. 2B is a schematic diagram of a high-definition map according to an embodiment of this application.

As shown in FIG. 2B, a key node layer is added based on the conventional navigation map. Key nodes are illustrated with larger solid dots in FIG. 2B. In one embodiment, to further improve definition of the map, a virtual lane line layer may be further added to the navigation map. The virtual lane line is used to indicate a driving route in an intersection area, and is a virtual curve that connects an exit lane and an entrance lane that are of the intersection. The virtual lane line may also be considered as a reference track line along which a vehicle travels in the intersection area. The key node layer provides an accurate instruction for a key scenario in which the vehicle travels, for example, in an intersection change scenario or a lane change scenario. Typical intersections include an urban crossroad, a T-shaped intersection, a pentagonal intersection, and the like.

Figure 2C:
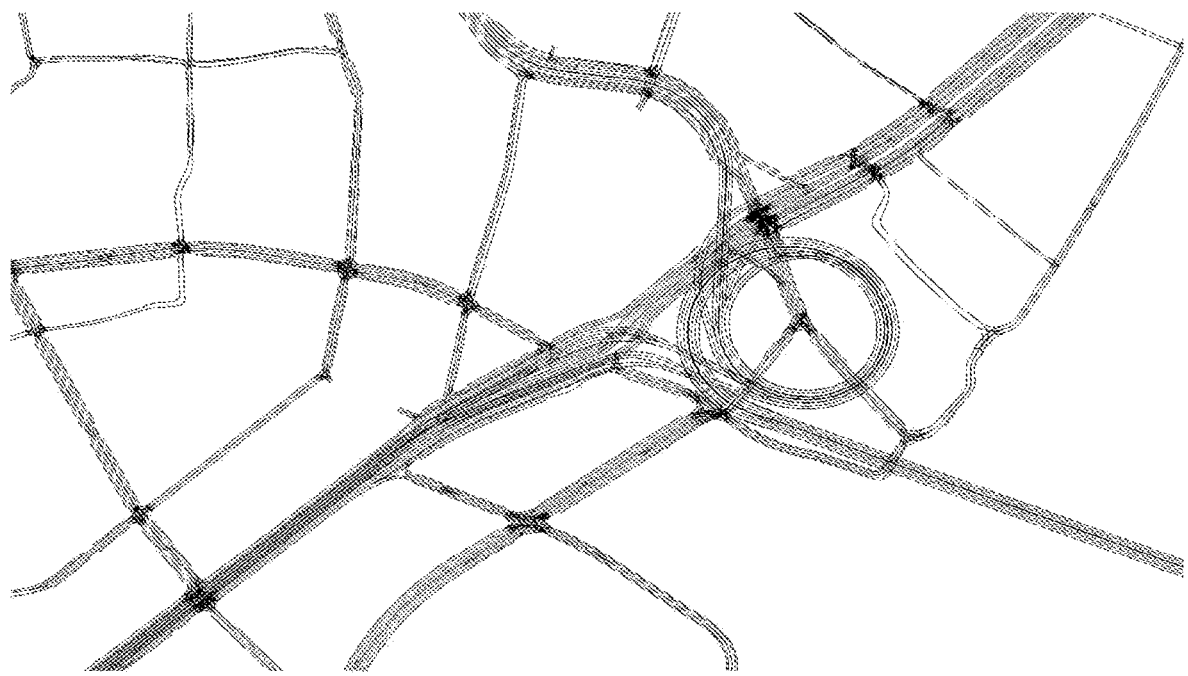
FIG. 2C is a schematic diagram of a high-definition map in the other approaches.

Compared with the existing high-definition map shown in FIG. 2C, the high-definition map provided in this application greatly reduces complexity, a data volume, and production costs of the map, which helps to improve loading and use efficiency on a basis of ensuring the definition.

Figure 3:
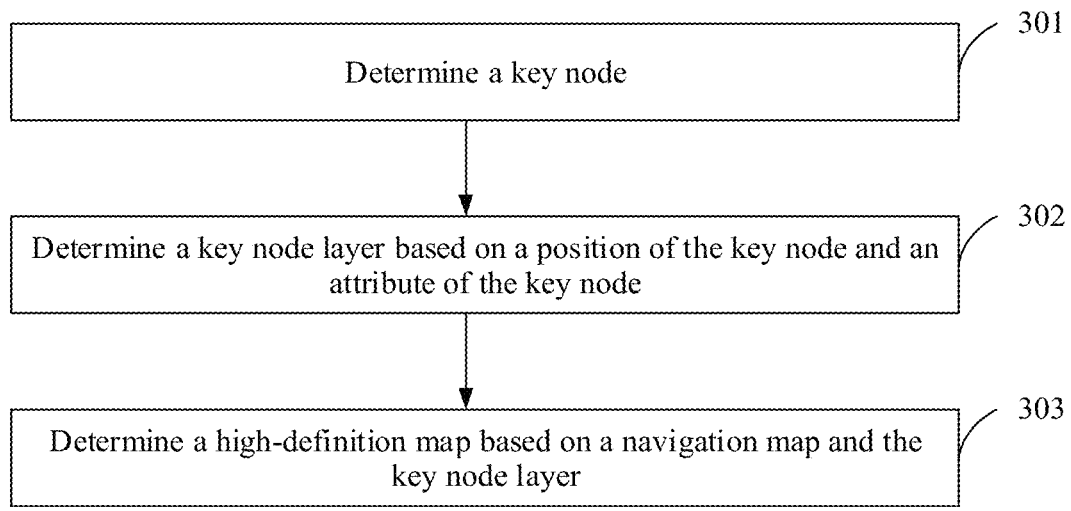
FIG. 3 is a schematic flowchart 1 of a high-definition map building method according to an embodiment of this application.

As shown in FIG. 3, detailed steps of a high-definition map building method provided in this application are described as follows. The high-definition map building method provided in this application may be performed by a vehicle, or may be performed by a cloud server. For example, the vehicle collects information such as a position and an attribute of a key node, and sends the information to the cloud server. The cloud server determines the key node and builds a high-definition map. A manner of updating the high-definition map may also be performed by the vehicle or the cloud server.

S301: Determine a key node.

The key node is used to describe information about a key position of a lane attribute change.

S302: Determine a key node layer based on a position of the key node and an attribute of the key node.

In some embodiments, the position of the key node is a point coordinate value of the key node in a coordinate system of a Global Positioning System (GPS), and is a geographic coordinate of the key node. There is a plurality of methods to determine the position of the key node. For example, a manual labeling method may be used to collect a position of each key node. In one embodiment, positions of exclusive right-turn lane start and end points and lane start and end points may be determined in this method. In an embodiment of this application, a method for automatically collecting a position of a key node by combining binocular vision with a GPS may be further used. The method is described in detail below.

The attribute of the key node includes one or more of the following: an ID of the key node, an ID of a mesh to which the key node is mapped in the navigation map, an ID of a road to which the key node is mapped in the navigation map, a number of a lane in which the key node is located, or a type of the key node. The attribute of the key node is used to describe a relationship between the key node layer and a conventional navigation map. Attributes of the key node (or attributes of the key node layer) may be indicated by Table 1.

TABLE 1

| Attribute name | Type | Description |
| --- | --- | --- |
| node_ID | int | Globally unique ID of a key node |
| mesh_ID | int | Mesh ID associated with a key node |
| road_ID | int | Road ID associated with a key node |
| lane_num | int | Bidirectional road: [−n, . . . , −1] an $n^{th}$ reverse lane to a $1^{st}$ reverse lane<br>[0] a central lane line<br>[1, . . . , n] a $1^{st}$ forward lane to an $n^{th}$ forward lane<br>Unidirectional road: [0, . . . , n] a $0^{th}$ forward lane to an $n^{th}$ forward lane |
| node_type | int | 0: a lane change point<br>1: lane start and end points<br>2: exclusive right-turn lane start and end points |
| node_type_2 | int | Lane change point: −1 a quantity of lanes decreases<br>1 a quantity of lanes increases<br>Lane start and end points: −1 a start point<br>1 an end point<br>Exclusive right-turn lane start and end points: −1 a start point<br>1 an end point |

As shown in Table 1, the identifier of the key node (node_ID) is used to indicate the globally unique ID of the key node, and is used to distinguish between different key nodes. The ID may also be denoted as an id. node_ID is an automatically generated identifier. The mesh identifier (mesh_ID) is used to indicate the ID of the mesh that is mapped by the key node to the conventional navigation map, and is used to distinguish among different meshes. The mesh identifier is used to establish a mapping relationship between the key node and the mesh of the navigation map. mesh_ID is derived from an attribute of a road route in the conventional navigation map. The mesh is an attribute in the conventional navigation map, and is used to determine a position in the navigation map. The road identifier (road_ID) is used to indicate the ID of the road that is mapped by the key node to the conventional navigation map, and is used to distinguish between different roads. The road identifier is used to establish a mapping relationship between the key node and the road of the navigation map. road_ID is derived from an attribute of a road route in the conventional navigation map. A lane sequence number or a lane line sequence number (lane_num) indicates a sequence number of a lane in which the key node is located, and is used to distinguish between different lane lines. For example, the bidirectional road includes a forward lane and a reverse lane. The sequence number [−n, . . . , −1] may be used to indicate the $n^{th}$ reverse lane to the $1^{st}$ reverse lane. [0] may be used to indicate the central lane line. The sequence number [1, . . . , n] may be used to indicate the $1^{st}$ forward lane to the $n^{th}$ forward lane. For the unidirectional road, the sequence number [0, . . . , n] may be used to indicate the $0^{th}$ forward lane to the $n^{th}$ forward lane. The type of the key node includes a type 1 (node_type) of the key node and a type 2 (node_type 2) of the key node. The type 1 of the key node includes the lane change point, the lane start and end points, and the exclusive right-turn lane start and end points. Different types are indicated by different sequence numbers, index numbers, or IDs. For example, 0 may be used to indicate the lane change point. 1 may be used to indicate the lane start and end points. 2 may be used to indicate the exclusive right-turn lane start and end points. The type 2 of the key node further refines the type 1 of the key node. Different sequence numbers, index numbers, or IDs may be used to further indicate the type 1 of the key node. For example, −1 is used to indicate that a subtype of the lane change point is: the quantity of lanes decreases. 1 is used to indicate that the subtype of the lane change point is: the quantity of lanes increases. −1 is used to indicate that a subtype of the lane start and end points is the lane start point. 1 is used to indicate that the subtype of the lane start and end points is the lane end point. −1 is used to indicate that a subtype of the exclusive right-turn lane start and end points is an exclusive right-turn lane start point. 1 is used to indicate that the subtype of the exclusive right-turn lane start and end points is an exclusive right-turn lane end point. lane_num, node_type, and node_type_2 are obtained when the position of the key node is determined.

A type of each attribute of the key node is int. int is a function for rounding down a value to a closest integer.

For an example of a value of the attribute of the key node and an example of the type of the key node, refer to descriptions in Table 3 and Table 4 below.

S303: Determine a high-definition map based on the navigation map and the key node layer.

The navigation map may be used to provide road-level navigation information. The high-definition map may be used to provide lane-level navigation information.

The ID of the key node is packed based on the position of the key node and the attribute of the key node. The key node layer is generated by packing the ID of the key node based on the position of the key node and the attribute of the key node, and by combining the self-owned attribute of the key node and a mapping relationship or association information between the key node and a navigation map layer.

The key node layer is added to a conventional navigation map layer. After the key node layer is superimposed on the map, the map uses the key node layer to provide, for the vehicle, a service with higher definition than a service of the conventional navigation map. The map can be simpler and less complex than an existing high-definition map. To further improve precision of the map on which the key node layer is superimposed, a virtual lane line layer may be further added.

Figure 4A:
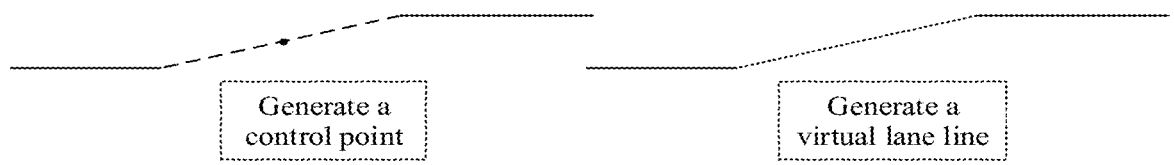
FIG. 4A is a schematic diagram of a control point of a straight-through virtual lane line according to an embodiment of this application.
Figure 4B:
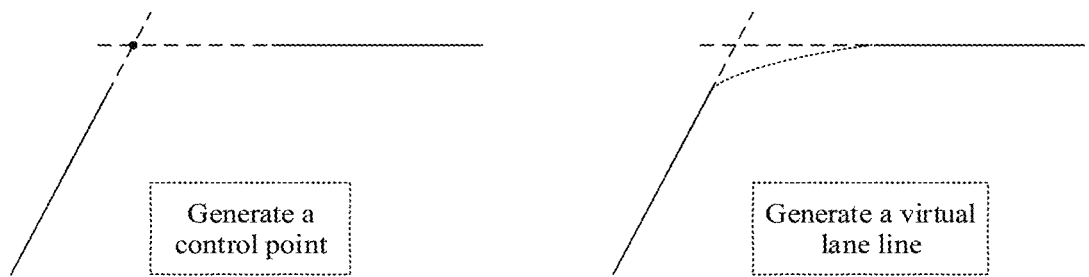
FIG. 4B is a schematic diagram of a control point of a turning virtual lane line according to an embodiment of this application.

Usually, no lane line is disposed in an intersection area. The high-definition map in this embodiment of this application superimposes the virtual lane line layer on the intersection area. A virtual lane line is used to indicate a lane change that complies with a traffic rule. One end of the virtual lane line is connected to a lane end point of an exit lane, and the other end is connected to a lane start point of an entrance lane. The lane end point and the lane start point are key nodes in the key node layer. In this way, a connection between the virtual lane line layer and the key node layer is established. The virtual lane line is generated based on the lane start and end points of the key node layer. In one embodiment, a third-order Bessel curve may be used as the virtual lane line, to make the virtual lane line smoother, and to make the vehicle more stable to travel when navigated by the virtual lane line. A control point is required when the third-order Bessel curve is generated. The virtual lane line is a route that guides the vehicle to travel in the intersection area. As shown in FIG. 4A, for a straight-through virtual lane line, a midpoint of a connection line between two key nodes is selected as the control point, and the generated Bessel curve is a straight line. As shown in FIG. 4B, for a turning virtual lane line, an intersection point of extension lines that are of the entrance lane and the exit lane is selected as the control point, and the generated Bessel curve is a smooth curve within an included angle between the two lanes. Certainly, the virtual lane line may alternatively use another curve type. The foregoing uses only the third-order Bessel curve as an example for description.

The virtual lane line layer is generated by packing an ID of the virtual lane line, and by combining a self-owned attribute of the virtual lane line, association information between the virtual lane line and the key node, and a mapping relationship between the virtual lane line and the navigation map layer. Attributes of the virtual lane line layer are described in Table 2.

TABLE 2

| Attribute name | Type | Description |
| --- | --- | --- |
| Virtual lane line identifier (virtual_lane_id) | int | Globally unique ID of a virtual lane line |
| s_node_id | int | Key node (Lane start point) id |
| p_node_id | int | Key node (Lane end point) id |

As shown in Table 2, the ID of the virtual lane line is the globally unique ID of the virtual lane line, and may be automatically generated. s_node_id is used to indicate an ID of a key node associated with the virtual lane line, and is the lane start point. p_node_id is used to indicate an ID of a key node associated with the virtual lane line, and is the lane end point.

The high-definition map can be stored as a shapefile. The shapefile is an open format of spatial data. The shapefile describes geometric and attribute features of the spatial data and is used to store geographic elements. A shapefile of the key node layer mainly includes the foregoing obtained information about the key node layer. The information includes geometric information and attribute information. The geometric information is a spatial coordinate of the key node, namely, the position of the key node. The attribute information is information about an attribute of the key node of the key node layer. A shapefile of the virtual lane line layer mainly includes the foregoing obtained information about the virtual lane line layer. The information includes geometric information and attribute information. The geometric information is spatial coordinates of control points of the virtual lane line. The attribute information is information about the attribute of the virtual lane line shown in Table 2.

In some embodiments of this application, a Geospatial Data Abstraction Library (GDAL) may be used to generate a shapefile based on geographic information (including a position) and attribute information of each layer. The GDAL is an open-source grid spatial data conversion library used for data conversion and processing.

Figure 4C:
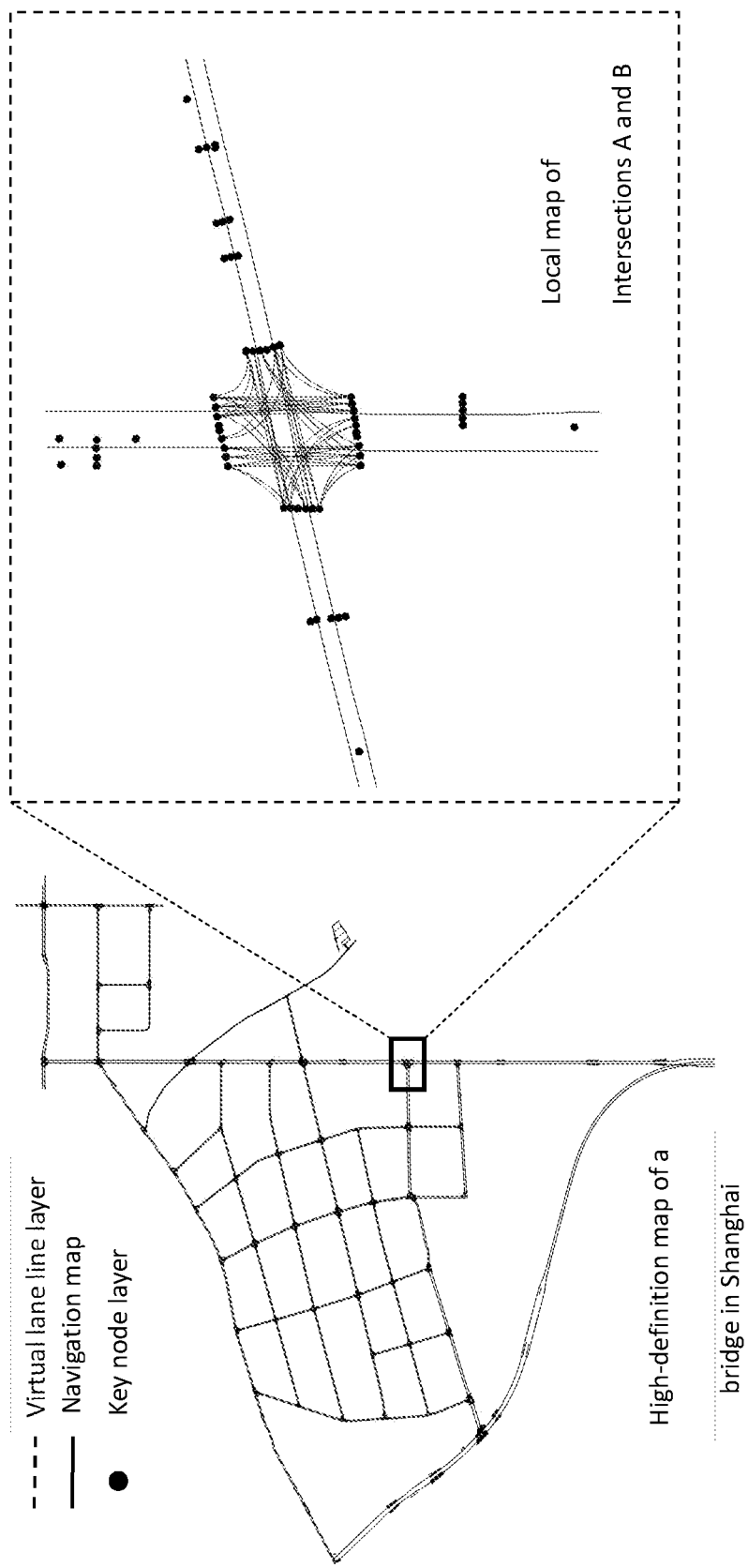
FIG. 4C is a schematic diagram of an implementation effect of a high-definition map according to an embodiment of this application.

A finally generated shapefile is shown in FIG. 4C. FIG. 4C shows a high-definition map at a bridge of Shanghai and a zoomed-in local map of an intersection between a road A and a road B. A bottom layer is the conventional navigation map. Solid points are the key node layer. Lines at the intersection are the virtual lane line layer.

The following describes the method for automatically collecting a position of a key node by combining binocular vision with a GPS according to an embodiment of this application. This method may be used to determine a position of a key node.

A vehicle-mounted camera obtains an image by frame. If a lane width change occurs in N consecutive frames of image in the image shot by the vehicle-mounted camera, and N is greater than a first predefined threshold, it is determined that the key node exists in the N frames of image. A geographic coordinate of the key node is determined. For example, a value of N may be 20. The change of lane width indicates that a lane is about to disappear or a lane is newly added, that is, a lane change point appears, for example, a convergence point generated when a quantity of lanes decreases, a fork point generated when the quantity of lanes increases, a fork junction of an exit lane of a highway, and a convergence point of an entrance lane of the highway. A purpose of setting the first predefined threshold is to avoid a misjudgment. If N is not greater than the first predefined threshold, it is considered that the lane width change currently occurring in the N consecutive frames of image is the misjudgment.

In an initial frame of image in the N frames of image, a lane width with the lane width change is less than a second predefined threshold. For example, the second predefined threshold is one meter. Alternatively, in an end frame of image in the N frames of image, the lane width with the lane width change is less than a third predefined threshold. The third predefined threshold may be the same as or different from the second predefined threshold. For example, the third predefined threshold is also set to one meter. For example, with reference to an application scenario, it is assumed that a case in which the lane width change is that the lane is about to disappear. In the end frame of image in the N frames of image, the lane width with the lane width change is less than the third predefined threshold. It is assumed that a case in which the lane width change is that the line is newly added. In the initial frame of image in the N frames of image, the lane width with the lane width change is less than the second predefined threshold.

The following method may be used to determine that the lane width change occurs in any frame of image. A first change value and a second change value are determined for any frame of image in the N frames of image. If a larger value between the first change value and the second change value is greater than a fourth predefined threshold, it is determined that the lane width change occurs in the any frame of image. The first change value is an absolute value of a difference between a first lane width at a first pixel in the any frame of image and a second lane width at a second pixel in the any frame of image. The second change value is an absolute value of a difference between the first lane width at the first pixel in the any frame of image and a third lane width at a first pixel in a previous frame of image of the any frame of image.

Figure 5:
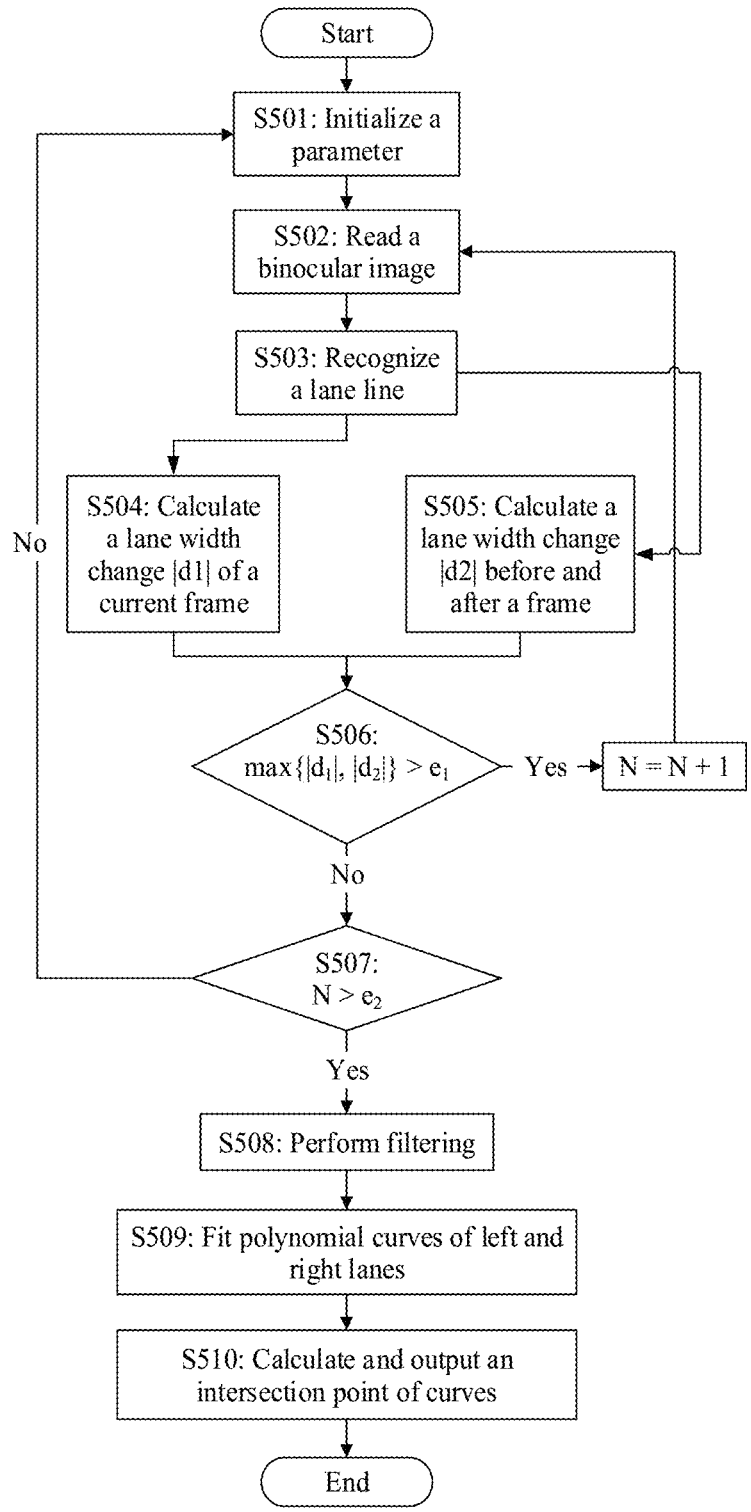
FIG. 5 is a schematic diagram of a method for determining a position of a lane change point according to an embodiment of this application.

As shown in FIG. 5, in a possible implementation, steps of the method for automatically collecting a position of a key node by combining binocular vision with a GPS are described as follows. The following description may be described with reference to a schematic diagram shown in FIG. 6.

S501: Set an initial parameter.

A quantity N of image frames is set to zero, where N indicates a quantity of frames in which a lane width change continuously occurs.

S502: Read a binocular image.

A vehicle-mounted camera shoots an image and sequentially reads the binocular image by frame based on a sensor interface of the vehicle-mounted camera.

S503: Recognize a lane line.

A left eye camera is used as a main camera. An image captured by the main camera is analyzed according to a machine learning method, to recognize left and right sidelines of a lane on which a vehicle is located in the image. As shown by dashed lines in FIG. 6, the dashed lines are the left and right sidelines of the lane recognized by the vehicle, namely, the lane line.

S504: Select a current frame, and calculate a first change value |d1| of a lane width change in a current frame of image.

The first change value is an absolute value of a difference between a first lane width at a first pixel in the current frame of image and a second lane width at a second pixel in the current frame of image.

Figure 6:
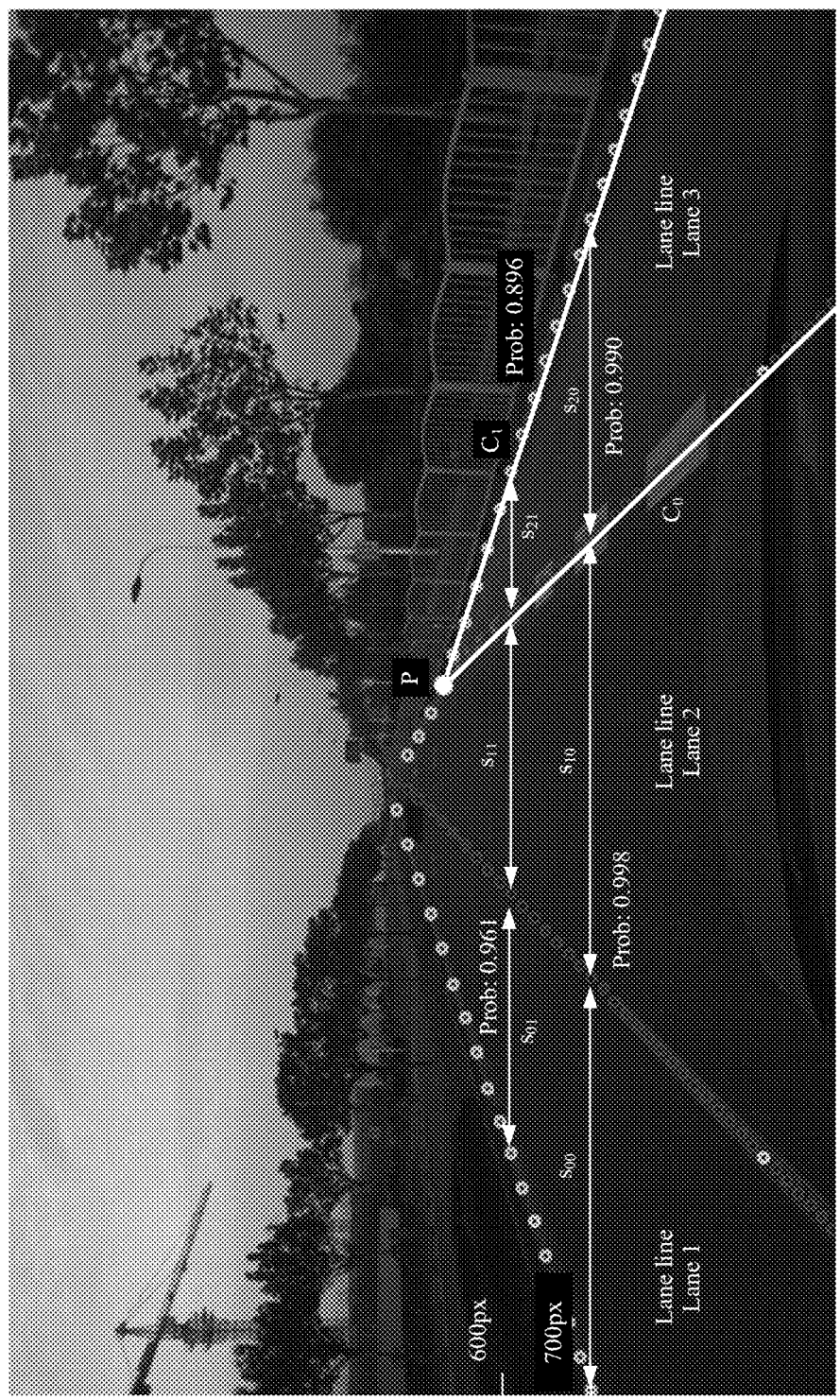
FIG. 6 is a schematic diagram of calculating a position of a lane change point according to an embodiment of this application.

As shown in FIG. 6, the current frame of image includes three lanes: a lane 1, a lane 2, and a lane 3. It is assumed that the first pixel is 700 px, and the second pixel is 600 px. For the lane 1, the lane 2, and the lane 3, horizontal distances of pixels on the lane line are separately calculated at vertical coordinates 700 px and 600 px of the image. For example, the horizontal distances of pixels are indicated by S00, S01, S10, S11, S20, and S21. The distance is a distance between actual ground points that are corresponding to pixels in a vehicle coordinate system. Conversion from an image pixel coordinate to a coordinate in the vehicle coordinate system can be obtained by calculating an internal parameter and an external parameter of a camera. This is not described in detail herein. d1=max{S00-S01, S10-S11, S20-S21} indicates a change value of a maximum lane width change in the current frame. FIG. 6 is used as an example, |d1|=S20−S21|.

S505: Calculate a second change value |d2| of the lane width change in the current frame compared with that in a previous frame.

The second change value is an absolute value of a difference between the first lane width at the first pixel in the current frame of image and a third lane width at a first pixel in a previous frame of image of the current frame of image.

FIG. 6 is still used as an example. For the lane 1, the lane 2, and the lane 3, the horizontal distances of pixels on the lane line are S00, S10, and S20 at the first pixel in the current frame of image. For the lane 1, the lane 2, and the lane 3, it is assumed that the horizontal distances of pixels on the lane line are S00', S10', and S20' at the first pixel in the previous frame of image of the current frame of image, namely, at the vertical coordinate 700 px. d2=max{S00'-S00, S10'-S10, S20'-S20} indicates the second change value of the lane width change in a frame before the maximum lane width change relative to a frame after the maximum lane width change. |d2|=|S20'−S20|.

S504 and S505 can be performed in any sequence.

S506: Determine, according to the first change value and the second change value, whether the lane width change occurs in the current frame.

If maximum values of d1 and |d2| are greater than a fourth predefined threshold $e_1$, it is determined that the lane width change occurs in the current frame, namely, the current frame may include a lane change point.

For example, the fourth predefined threshold may be twice a width of a standard lane paint line, namely, $e_1$=2*0.15 meters (m)=0.3 m.

If it is determined that the lane width change occurs in the current frame, N=N+1 is assigned, and S402 is returned to and performed. A next frame of image is read, and is processed in the same manner. If the maximum values of |d1| and |d2| are not greater than the fourth predefined threshold $e_1$, S507 continues to be performed.

S507: Determine whether a value of N is greater than a first predefined threshold $e_2$.

If N is greater than the first predefined threshold $e_2$, it indicates that a quantity of frames in which the lane width change continuously occurs is greater than the first predefined threshold. Then, it is determined that a key node exists in the N consecutive frames of image. If N is not greater than the first predefined threshold $e_2$, S501 is returned to and performed.

S508: Filter all lanes that are in N consecutive frames of image and on which a lane change may occur.

If the lane is a newly added lane, a start distance S20 of the lane in the initial frame in the N frames of image should be less than a second predefined threshold, for example, less than 1 m. Otherwise, the lane is filtered out. As shown in FIG. 6, the lane 1, the lane 2, and the lane 3 are filtered out and are not newly added lanes. If the lane is a lane that is about to disappear, a final distance of the lane in a last frame in the N frames of image should be greater than a third predefined threshold, for example, greater than 1 m. Otherwise, the lane is filtered out. As shown in FIG. 6, the lane 1 and the lane 2 are filtered out, and the lane 3 is the lane that is about to disappear. After being filtered, the example shown in FIG. 6 obtains a unique selected lane, namely, the lane 3.

Information associated with the selected lane is obtained, including a lane number, that a quantity of lanes increases (the newly added lane), and that the quantity of lanes decreases (the lane that is about to disappear). The information is recorded in attributes of the key node: lane_num, node_type, and node_type_2.

S509: Fit polynomial curves of left and right lanes based on the lane on which the lane width change occurs.

FIG. 6 is used as an example. Pixel coordinates of left and right lane lines of the lane 3 are converted into actual ground points corresponding to pixels in the vehicle coordinate system. Polynomial curve fitting is performed based on these points, to obtain two polynomial curves C0 and C1.

S510: Determine an intersection point P of two polynomial curves C0 and C1, and obtain a geographic coordinate of the intersection point P.

The intersection point P is a key node, namely, a lane change point at which the quantity of lanes decreases. In this way, a position of the key node P and the foregoing attributes such as lane_num, node_type, and node_type_2 of the key node are obtained.

The foregoing is a process of a high-definition map building method provided in this embodiment of this application.

According to the foregoing provided high-definition map building method, the following further describes, with reference to an application scenario, details of the high-definition map building method provided in the embodiment of this application.

Figure 7:
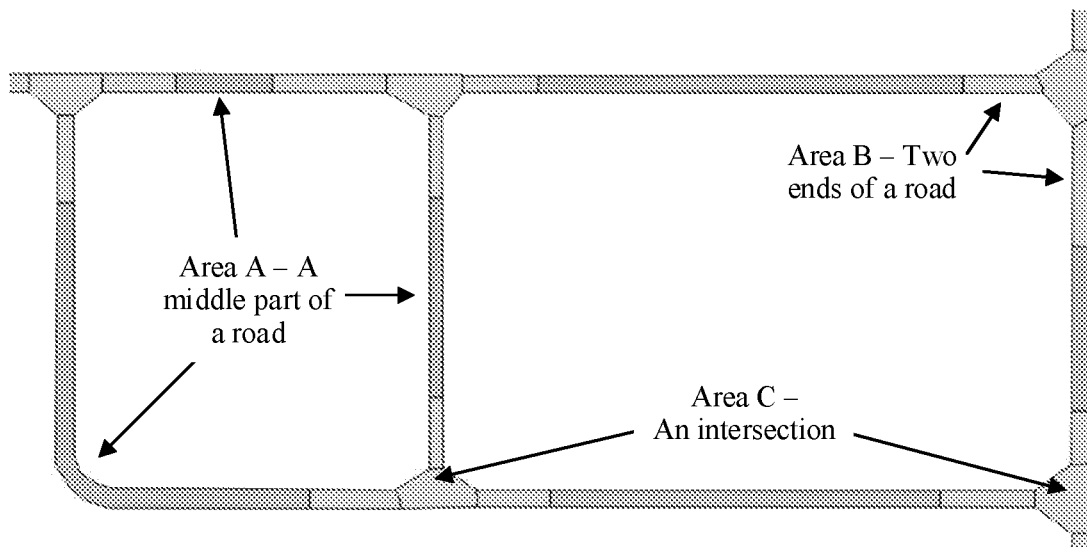
FIG. 7 is a schematic diagram of road partitioning according to an embodiment of this application.

For ease of description, as shown in FIG. 7, areas of a road are divided in this embodiment of this application. For a common road traffic environment, the road may be divided into three areas: A, B, and C. The area A indicates a middle part of the road, the area B indicates two ends of the road, and the area C indicates an intersection area. The two ends of the road are areas close to the intersection, and may be divided based on actual experience.

Based on road area division shown in FIG. 7 and a definition that is of an attribute of a key node and that is in Table 1, information such as a key node of each area and an attribute of a virtual lane line is shown in Table 3.

TABLE 3

Figure 8A:
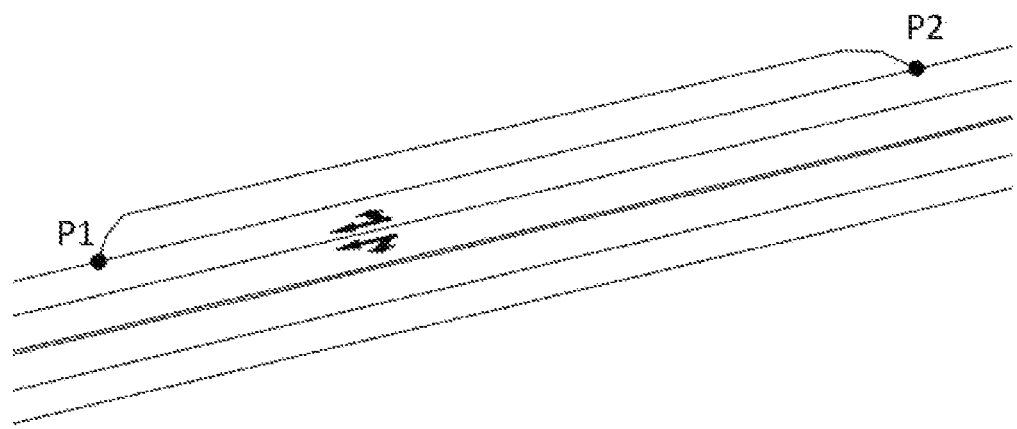
FIG. 8A is a schematic diagram of lane change points in the middle of a road according to an embodiment of this application.
Figure 8B:
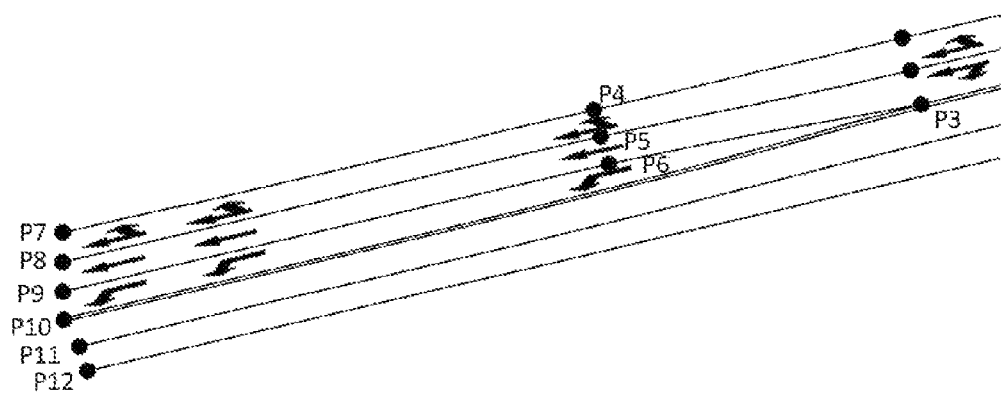
FIG. 8B is a schematic diagram of lane change points at two ends of a road according to an embodiment of this application.
Figure 8C:
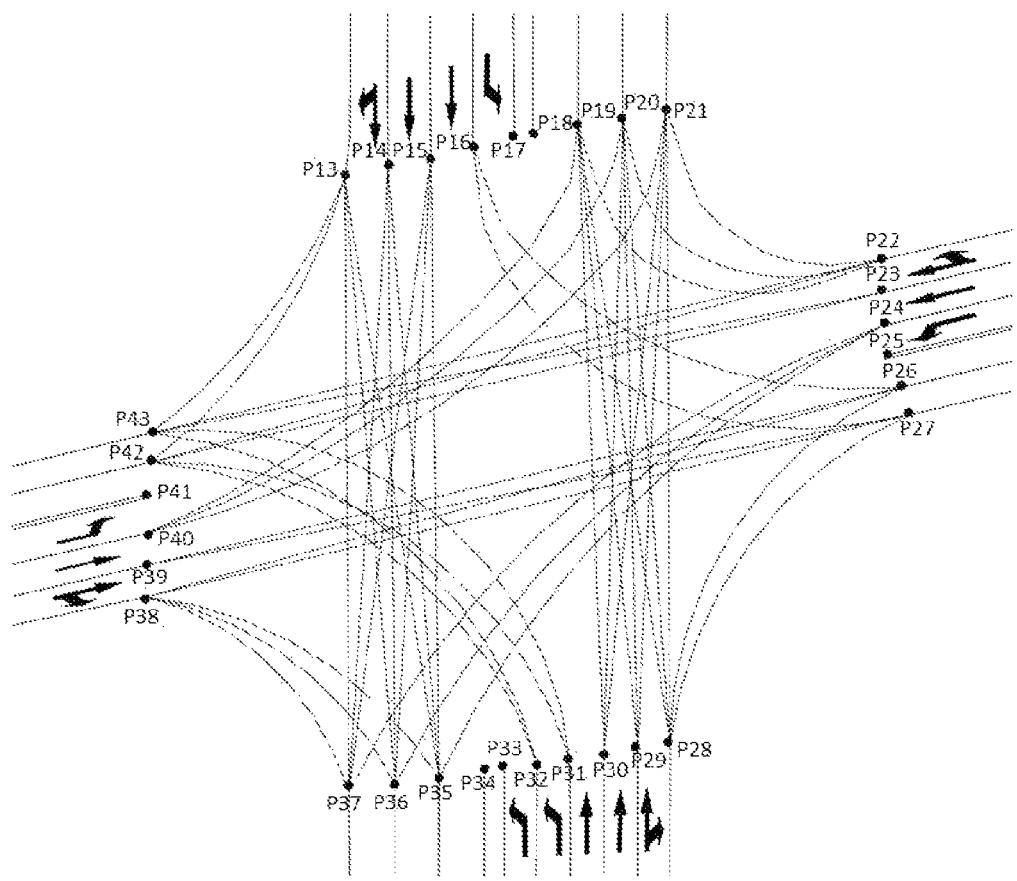
FIG. 8C is a schematic diagram of lane change points and a virtual lane line that are at an intersection according to an embodiment of this application.

|  | Area A-Middle part of a road | Area B-Two ends of a road | Area C-Intersection |
| --- | --- | --- | --- |
| Schematic diagrams of key nodes | Lane change points in a middle part of a road shown in FIG. 8A | Lane start and end points and lane change points at two ends of a road shown in FIG. 8B | Lane start and end points and virtual lane lines at an intersection shown in FIG. 8C |
| Positions of the key nodes | $P_1$(121.623175, 31.247183) $P_2$(121.623527, 31.247190) | $P_3$(121.621815, 31.250051) $P_4$(121.621652, 31.250044) $P_5$(121.621771, 31.250036) . . . $P_{12}$(121.621598, 31.250036) | $P_{13}$(121.620651, 31.250040) $P_{15}$(121.620988, 31.250038) $P_{16}$(121.620803, 31.250042) . . . $P_{43}$(121.620956, 31.250040) |
| Attributes of the key nodes | $P_1$ node_id: 99900001 mesh_id: 10013213 road_id: 10100012 lane_num: 3 node_type: 2 node_type_2: −1 | $P_3$ node_id: 99900003 mesh_id: 10013213 road_id: 10100339 lane_num: 2 node_type: 0 node_type_2: −1 | $P_{14}$ node_id: 99900014 mesh_id: 10013213 road_id: 10100012 lane_num: 2 node_type: 1 node_type_2: −1 |

Table 3 shows examples of the positions and the attributes of the key nodes P1 to P43. The position of the key node is a coordinate value of the key node in a world coordinate system, including longitude and latitude, namely, the position of the key node. The position of the key node may be determined through the foregoing provided method. For example, the longitude of the key node P1 is 121.623175, and the latitude is 31.247183. For P1, node_id is 99900001, mesh_id is 10013213, road_id is 10100012, lane_num is 3, node_type is 2, and node_type_2 is −1. It can be further learned from FIG. 8C that there is a mapping relationship between each virtual lane line and at least two key nodes.

As described above, the type of the key node includes the lane change point, the lane start and end points, and the exclusive right-turn lane start and end points. As shown in Table 3, meanings and schematic diagrams of various types of key nodes are described as follows.

Figure 10:
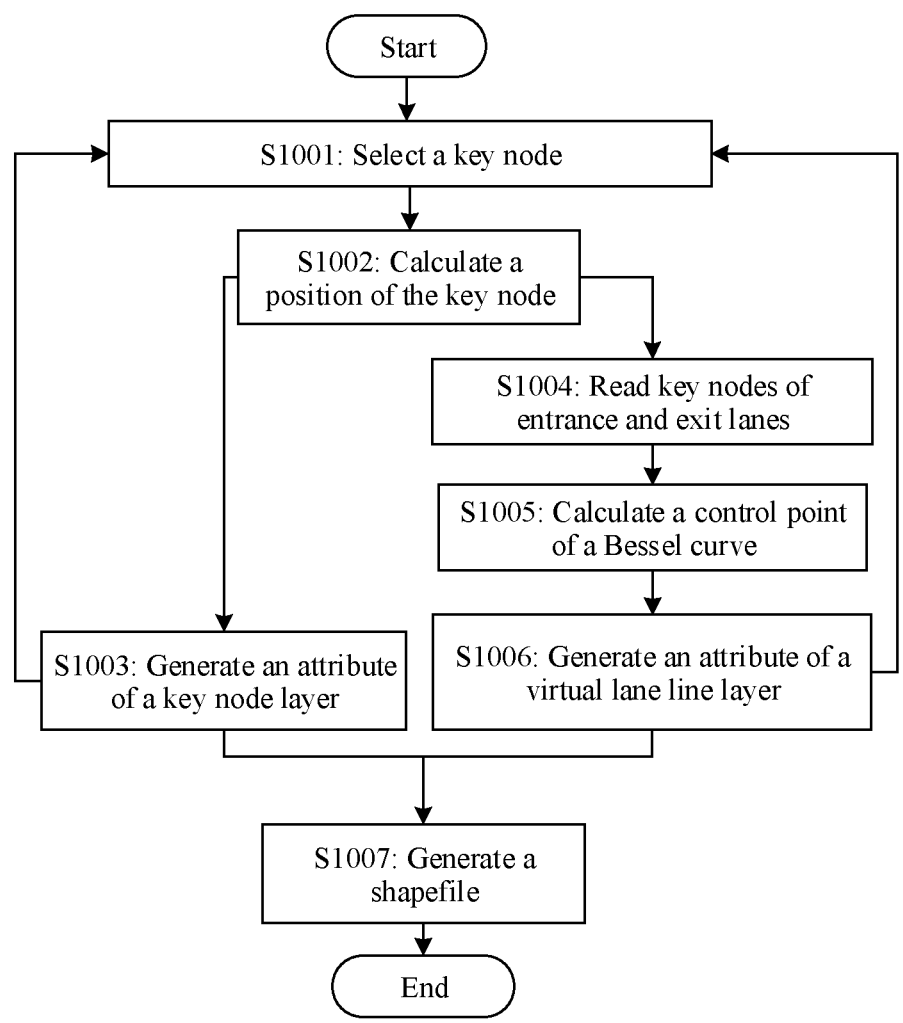
FIG. 10 is a schematic flowchart 2 of a high-definition map building method according to an embodiment of this application.

Based on the foregoing description, when the high-definition map includes a navigation map layer, a key node layer, and a virtual lane line layer, FIG. 10 is a schematic flowchart of a high-definition map building method in one embodiment.

S1001: Select a key node.
S1002: Calculate a position of the key node.
S1003: Generate an attribute of a key node layer.
S1004: Read key nodes of entrance and exit lanes of an intersection area.

For example, the key nodes are lane start and end points at an intersection.

S1005: Calculate a control point of a Bessel curve.
S1006: Generate an attribute of a virtual lane line layer.
S1007: Generate a shapefile based on the attribute of the key node layer and the attribute of the virtual lane line layer.

TABLE 4

Figure 9A:
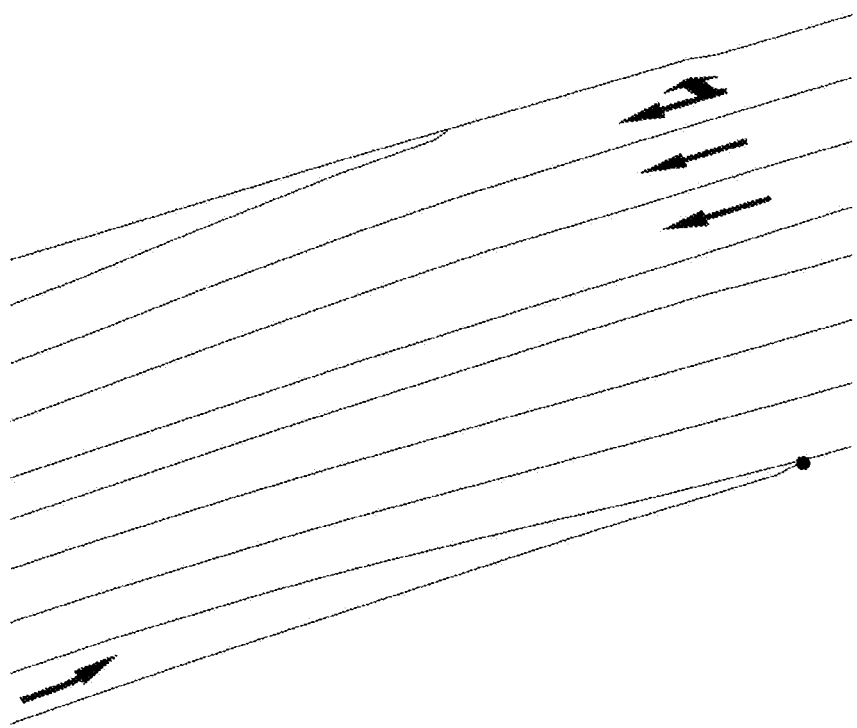
FIG. 9A is a schematic diagram of a key node at which a quantity of lanes decreases according to an embodiment of this application.
Figure 9B:
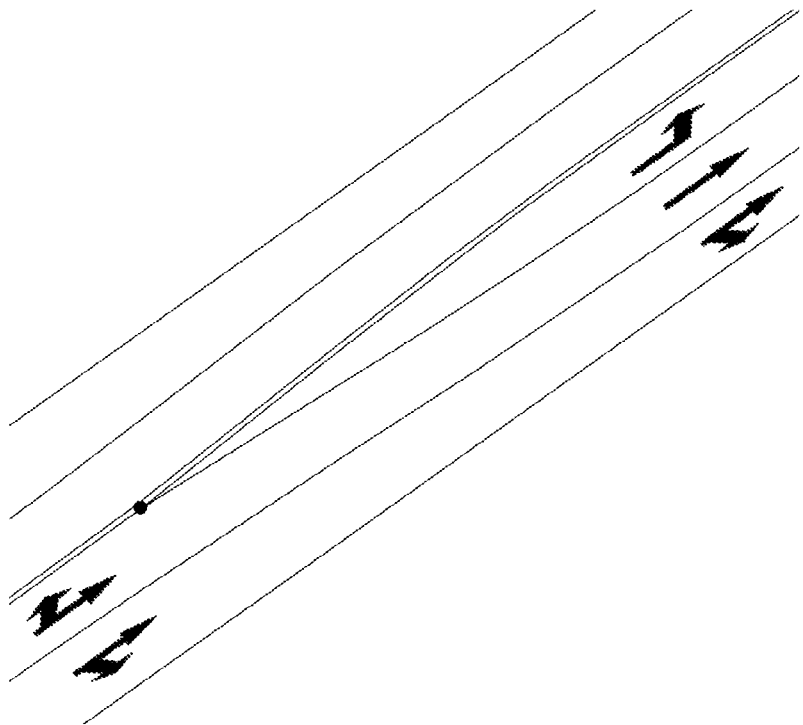
FIG. 9B is a schematic diagram of a key node at which a quantity of lanes increases according to an embodiment of this application.
Figure 9C:
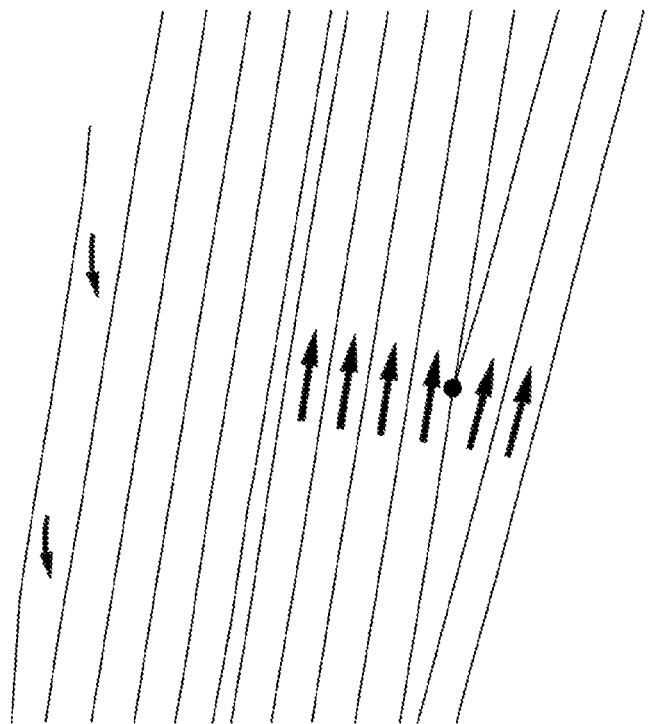
FIG. 9C is a schematic diagram of a lane fork point according to an embodiment of this application.
Figure 9D:
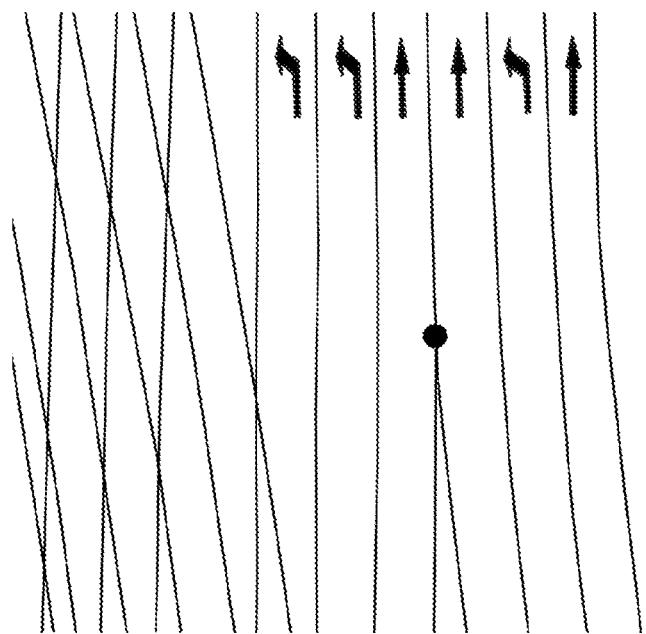
FIG. 9D is a schematic diagram of a lane convergence point according to an embodiment of this application.
Figure 9E:
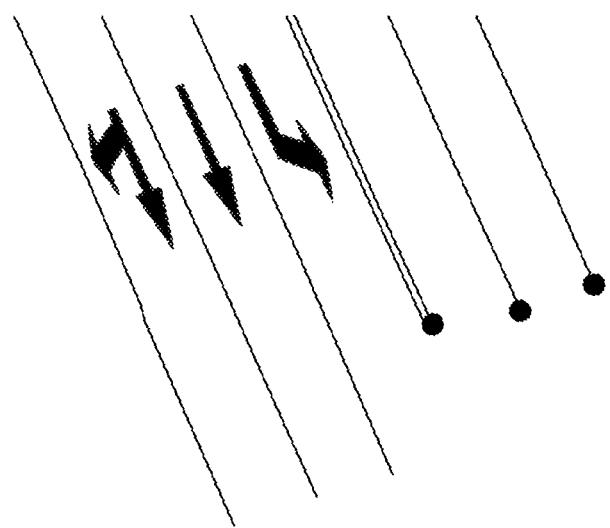
FIG. 9E is a schematic diagram of a lane start point according to an embodiment of this application.
Figure 9F:
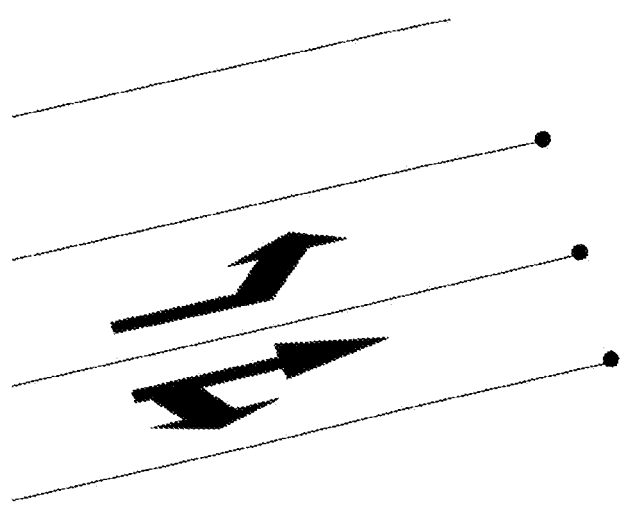
FIG. 9F is a schematic diagram of a lane end point according to an embodiment of this application.
Figure 9G:
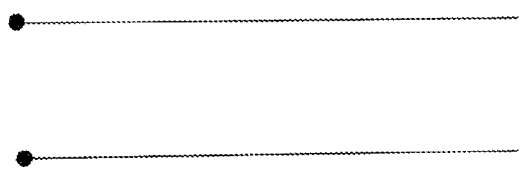
FIG. 9G is a schematic diagram of an exclusive right-turn lane start point according to an embodiment of this application.
Figure 9H:
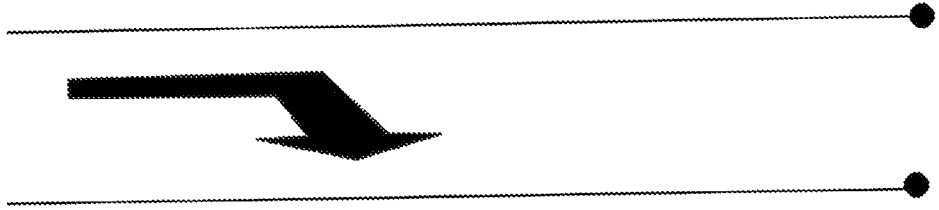
FIG. 9H is a schematic diagram of an exclusive right-turn lane end point according to an embodiment of this application.

| Types of key nodes | Subtypes of the key nodes | Schematic diagrams |
| --- | --- | --- |
| Lane change points | Quantity of lanes increases (Four lanes changes to three lanes on a southwest to northeast road, where a solid point is a lane change key node) | As shown in FIG. 9A |
|  | Quantity of lanes decreases (Two lanes changes to three lanes on a southwest to northeast road, where a solid point is a lane change key node) | As shown in FIG. 9B |
|  | Lane fork point (A northbound six-lane road forks into a northbound four-lane road and a northeast-bound two-lane road, where a solid point is a lane fork key node) | As shown in FIG. 9C |
|  | Lane convergence point (A northbound three-lane road and a northwest-bound three-lane road converge into a northbound six-lane road, where a solid point is a lane convergence key node) | As shown in FIG. 9D |
| Lane start and end points | Lane start points (solid points) | As shown in FIG. 9E |
|  | Lane end points (solid points) | As shown in FIG. 9F |
| Exclusive right-turn lane start and end points | Exclusive right-turn lane start points (solid points) | As shown in FIG. 9G |
|  | Exclusive right-turn lane end points (solid points) | As shown in FIG. 9H |

In conclusion, the high-definition map building method provided in the embodiments of this application is described. In the embodiments of this application, unlike an existing high-definition map, not all lane lines on each road are described. For a scenario requiring attention in vehicle driving, such as the intersection or a lane change point, the key node is selected. A position and an attribute of the key node are determined, and the key node is embedded into a navigation map. The map may be used to frame a behavior of automatic driving in these special scenarios, and the key node is used to replace complete lane line information. This helps reduce a data volume of the map. Further, for a defect of a lack of information on an intersection navigation map, in this embodiment of this application, a series of virtual lane lines are generated based on a vehicle traveling behavior that complies with a traffic rule. According to a design in this embodiment of this application, a data volume per kilometer of the high-definition map can be reduced to within 1/105. As the data volume is reduced, production costs are also reduced.

Figure 11:
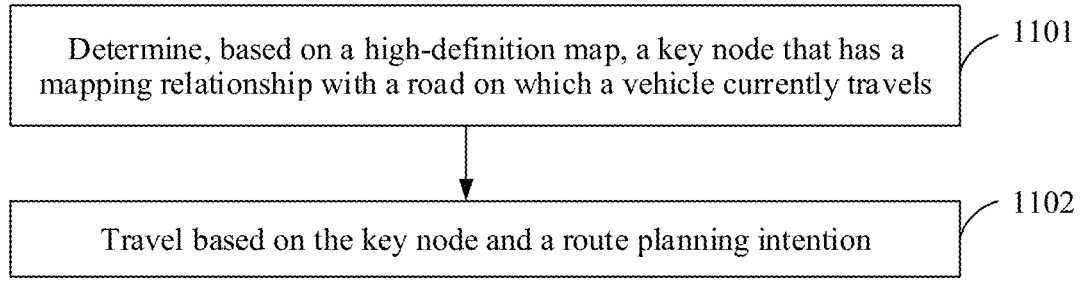
FIG. 11 is a schematic flowchart of a high-definition map application method according to an embodiment of this application.

According to the foregoing provided high-definition map building method, as shown in FIG. 11, the following describes a high-definition map application method. The method may be performed by a vehicle.

S1101: Determine, based on a high-definition map, a key node that has a mapping relationship with a road on which a vehicle currently travels.

The high-definition map includes a navigation map and a key node layer. The navigation map is used to provide road-level navigation information, and the key node layer includes a position of the key node and an attribute of the key node. For other descriptions of the high-definition map, refer to the foregoing description. Details are not described herein again.

S1102: Travel based on the key node and a route planning intention.

The key node may include one or more key nodes. For example, when there are a plurality of key nodes, the key nodes may be indicated by a first key node, a second key node, or the like. In detail, when normally traveling on the middle part of a road, except for occasionally changing a lane, the vehicle mostly smoothly travel on one lane. In this phase, a conventional navigation map may be used for navigation. A projected point from the first key node to the road is determined. The vehicle travels along a road route based on a distance between a traveling position of the vehicle and the projected point and based on the road-level navigation information provided by the navigation map. When traveling close to an intersection, the vehicle may change the lane based on the key node layer. In detail, when the traveling position of the vehicle reaches the projected point, the vehicle changes the lane based on to the route planning intention. Then, the vehicle passes through the intersection based on the key node and a virtual lane line. In detail, the vehicle travels based on a distance between the traveling position of the vehicle and the second key node. When it is determined that the traveling position of the vehicle reaches the second key node, the vehicle passes through the intersection based on the route planning intention and the virtual lane line. The virtual lane line is determined by the second key node and a third key node.

The following further describes in detail, with reference to an application scenario, the high-definition map application method provided in this application.

Figure 12:
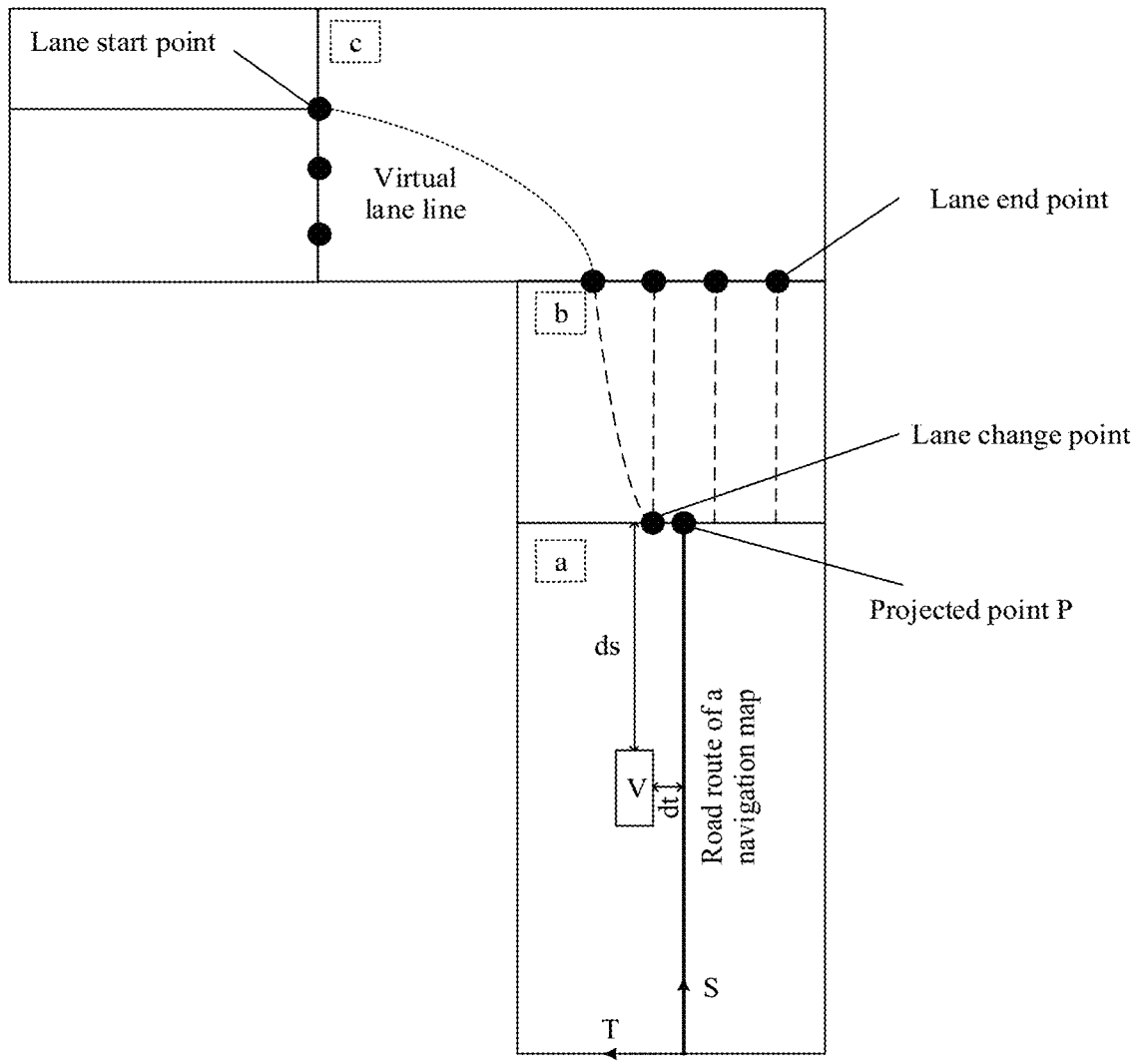
FIG. 12 is a schematic application diagram of a high-definition map according to an embodiment of this application.

The high-definition map may be applied to an automatic driving scenario. FIG. 12 is a schematic diagram of a process by which an automatic driving vehicle passes through an intersection by using a high-definition map.

Based on the road area division shown in FIG. 7, a road may be divided into three areas: A, B, and C. Table 3 shows attributes of key nodes in the three areas. Correspondingly, that the vehicle passes through a road shown in FIG. 12 may be divided into three phases: a phase a, a phase b, and a phase c. The phase a is a phase in which the vehicle normally travels in the area A, namely, a middle part of the road. The phase b is a phase in which the vehicle travels in the area B, namely, two ends of the road. The phase c is a phase in which the vehicle travels in the area C, namely, an intersection area. In the phase a, the vehicle may smoothly move forward on a current road. In the phase b, the vehicle may change to a corresponding lane according to a planned route before entering the intersection. In the phase c, the vehicle may enter a next road through the intersection. At least one of the foregoing three phases may continue to be completed on the next road until a destination is reached.

The following breaks down and describes the process that is shown in FIG. 12 and in which the high-definition map is applied to traveling. The process may be described in three phases: a, b, and c.

A road coordinate system is first defined. A forward axis is an S-axis along a road route of a navigation map, and a T-axis is an axis perpendicular to the S-axis and pointing to the left.

Figure 13A:
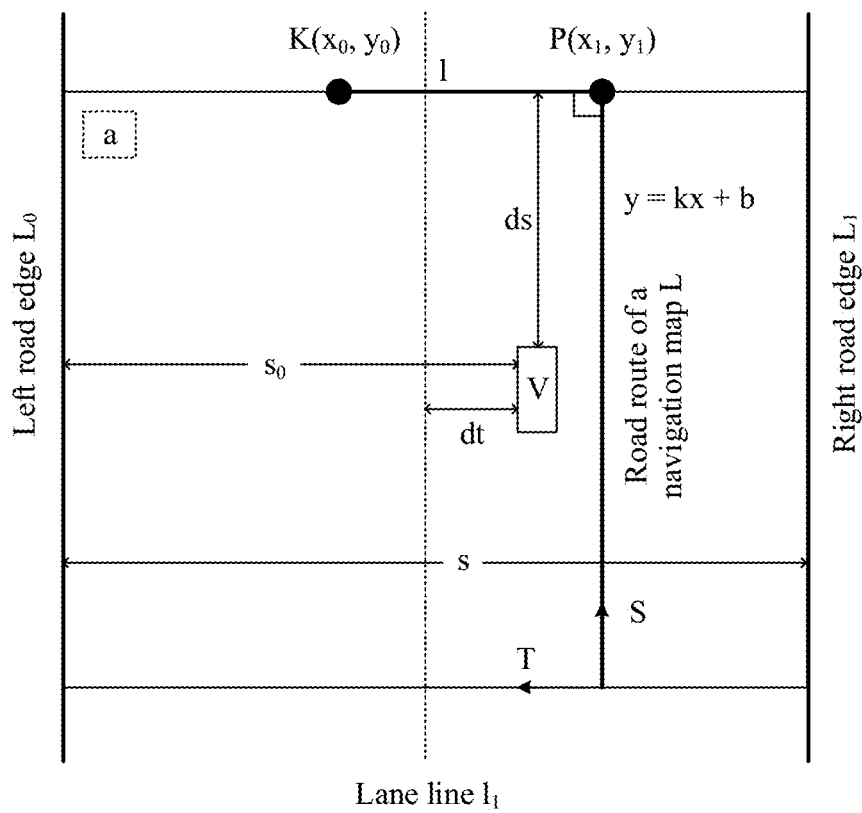
FIG. 13A is a schematic application diagram of a high-definition map in a phase a according to an embodiment of this application.
Figure 14A:
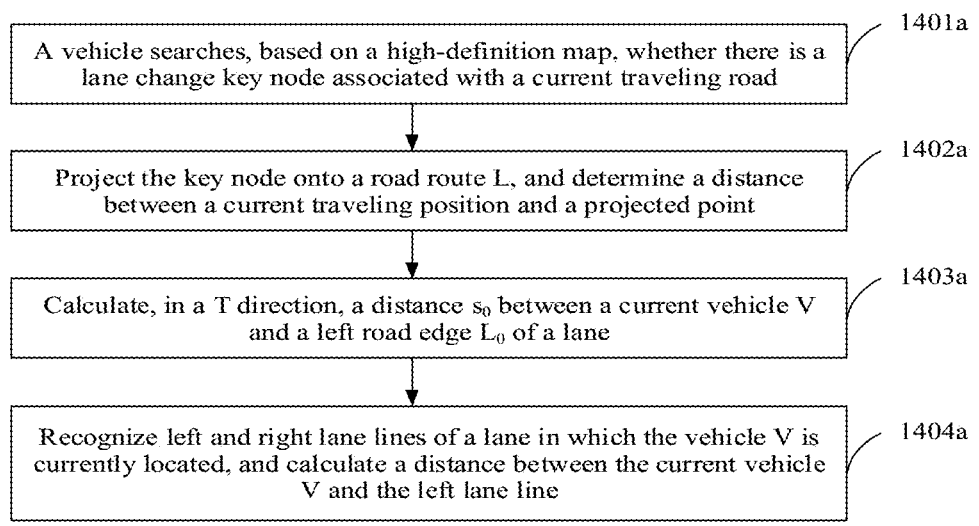
FIG. 14A is a schematic flowchart of a high-definition map application method in a phase a according to an embodiment of this application.

FIG. 13A is a schematic diagram of a vehicle navigated in a phase a. With reference to FIG. 13A, referring to FIG. 14A, a method for applying a high-definition map to a vehicle is described as follows.

S1401a: A vehicle searches, based on a high-definition map, whether there is a lane change key node associated with a current traveling road.

The vehicle is navigated based on a navigation map layer in the high-definition map, and travels smoothly in the phase a. The lane change key node is a key node whose type is a lane change point. An attribute of a key node in a key node layer of the high-definition map includes a road associated with the key node. The vehicle may query, by using the high-definition map, whether there is a lane change point associated with the current traveling road. A current traveling position of the vehicle is shown by V in FIG. 13A. The vehicle queries the high-definition map, and matches, based on the navigation map layer, the current traveling position to a road route L of the navigation map layer. The road route L may also be referred to as a road L, and is an attribute of the navigation map layer. A lane change point $K_5$ associated with the road L is determined based on road_id of the road L on the high-definition map. In detail, a position and an attribute of the lane change point $K_5$ are determined. The lane change point $K_5$ corresponds to the first key node. The lane change point means that the vehicle travels from the phase a to a phase b.

S1402a: Project the lane change key node onto a road route L, and determine a distance between a current traveling position and a projected point.

A moment at which the vehicle travels to the phase b needs to be payed attention to, namely, a distance between the current traveling position and the lane change point needs to be calculated. The lane change point $K_5$ is projected to the road route L, to obtain a projected point P. The distance between the current traveling position and the projected point P is calculated to reflect the distance between the current traveling position and the lane change point $K_5$.

For example, in a coordinate system of an S-axis and a T-axis, coordinates of a lane change point K are $x_0$ and $y_0$, and a straight line equation y=kx+b of the road route L of the navigation map layer is known. A method for calculating coordinates $x_1$ and $y_1$ of the projected point P is as follows.

The coordinates of the projected point P of the point $K_5$ are obtained, that is, an intersection point M of a straight line/that passes the point $K(x_0, y_0)$ and that is perpendicular to the straight line L is obtained. Because the two straight lines are perpendicular to each other, there is: k'k=−1, and the straight line/passing through the point K is: $y-y_1$=−k' $(x-x_0)$=−k−1 $(x-x_0)$. A calculation formula for calculating an intersection point of the two lines, namely, the projected coordinate $P(x_1, y_1)$ of the point $K_5$ in the straight line L is formula (1):

$$\begin{cases} y = kx + b \\ y - y_0 = -\frac{1}{k}(x - x_0) \end{cases} \Rightarrow \begin{cases} x_1 = \frac{k(y_0 - b) + x_0}{x^2 + 1} \\ y_1 = kx_1 + b \end{cases} \quad (1)$$

A distance ds between a GPS location of the current vehicle V and the projected point P is calculated along an S direction.

If there is no lane change key node associated with the current traveling road, all end key nodes of the current traveling road are obtained by querying the map. The end key node is a key node whose type is a lane end point. These end key nodes are projected onto the road route L. A projected point with a minimum distance between the projected point and a position of the vehicle V in the S direction is used as a reference point. Then the distance ds between the GPS location of the current vehicle V and the reference point is calculated along the S direction.

S1403a: Calculate, in a T direction, a distance so between a current vehicle V and a left road edge $L_0$ of a lane.

In detail, the distance so between the current vehicle V and the left road edge $L_0$ of the lane may be calculated by a millimeter-wave radar.

A total quantity of lanes on the current road is obtained by querying the map. As shown in FIG. 13A, there are two lanes on the current traveling road. Based on a road width s recorded on a navigation map, ½<$s_0$/s<1 is obtained through calculation. Therefore, it is inferred that the current vehicle V is on a second lane on the left side.

S1404a: Recognize left and right lane lines $I_3$ and $I_4$ of a lane in which the vehicle V is currently located, and calculate a distance dt between the current vehicle V and the left lane line through a binocular stereoscopic vision ranging method.

In this phase, the vehicle travels smoothly along a current lane and measured dt, or changes to an adjacent lane based on information about a lane in which the vehicle is located, to determine, based on a size of ds, whether to enter the phase b.

When ds is close to 0, it indicates that the vehicle V enters the phase b.

Figure 13B:
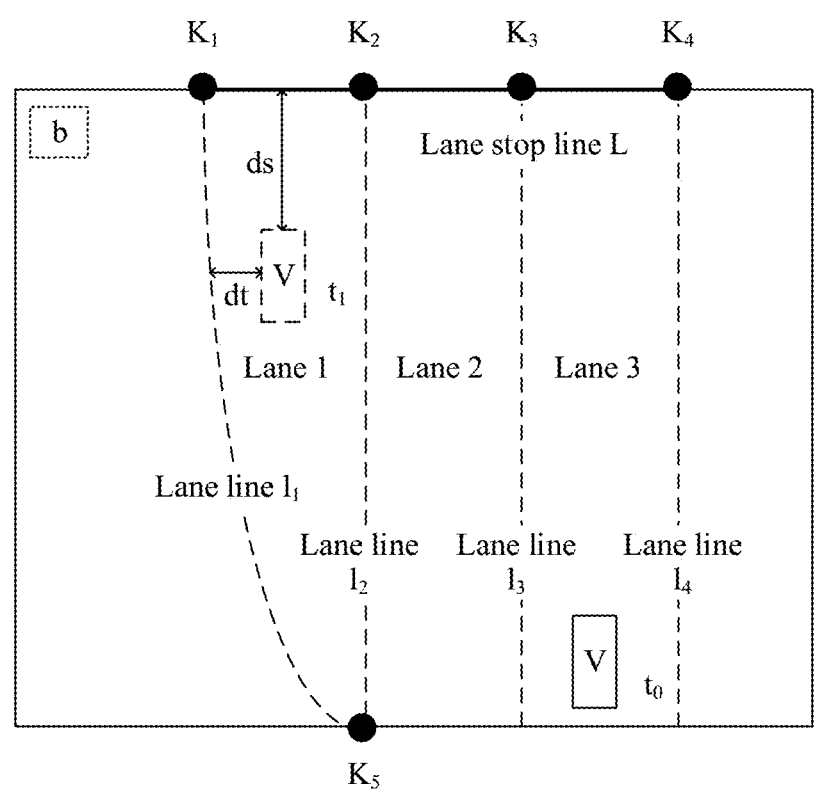
FIG. 13B is a schematic application diagram of a high-definition map in a phase b according to an embodiment of this application.
Figure 14B:
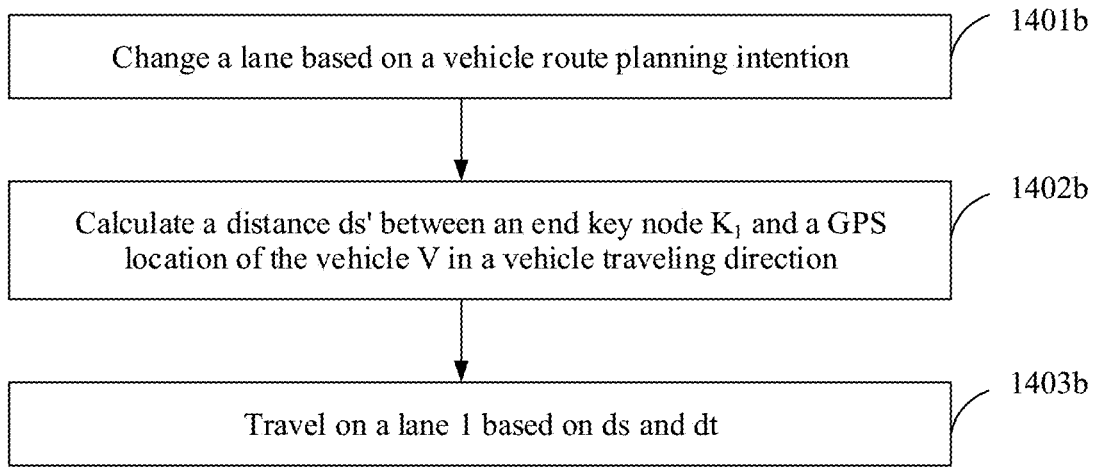
FIG. 14B is a schematic flowchart of a high-definition map application method in a phase b according to an embodiment of this application.

FIG. 13B is a schematic diagram of the vehicle V navigated in the phase b. With reference to FIG. 13B, referring to FIG. 14B, the method for applying a high-definition map to a vehicle is described as follows.

S1401b: Change a lane based on a vehicle route planning intention.

The route planning intentions include going straight through, turning left, and turning right. A quantity of lanes in the phase b, a lane in which the vehicle V is located when the vehicle V enters the phase b, and a to-be-entered lane are determined by querying the map. Based on visual-awareness based lane line recognition, the vehicle is guided to change to a corresponding lane. As shown in FIG. 13B, it is obtained, by querying the map, that there are three lanes in total in the phase b. The three lanes are indicated by a lane 1, a lane 2, and a lane 3. The lane 1 is for turning left, the lane 2 is for going straight through, and the lane 3 is for turning right. The current vehicle V (shown in a solid-line block) is on the lane 3 in the phase b at an end moment (that is, a moment to) of the phase a. It is assumed that the vehicle route planning intention is to turn left. Input lane lines $I_2$ and $I_3$ are recognized by the visual-awareness based lane line recognition. The vehicle V is guided to cross the two lane lines, to reach a position of the vehicle V (shown by a dashed-line block) on the lane 1 in FIG. 13B. When reaching the position indicated by the dashed-line block, the vehicle V is located at a moment ti.

S1402b: After lane change is completed at a moment ti, obtain, by querying a map, an end key node $K_1$ corresponding to a left lane line $l_1$ of a lane in which a vehicle V (shown by a dashed-line block) is located, and calculate a distance ds' between the end key node $K_1$ and a GPS location of the vehicle V in a vehicle traveling direction. In addition, the left and right lane lines $l_1$ and $l_2$ of the lane in which the vehicle is currently located are visually recognized. A distance dt' between the vehicle V (the dashed-line block) and the left lane line $l_1$ is calculated through the binocular stereo vision ranging method.

S1403b: The vehicle V travels on a lane 1 based on ds and dt until traveling to a lane stop line L, and a phase b ends.

The lane stop line L includes four key nodes that are lane end points. The four key nodes are indicated by $K_1$, $K_2$, $K_3$, and $K_4$ in FIG. 13B.

Figure 13C:
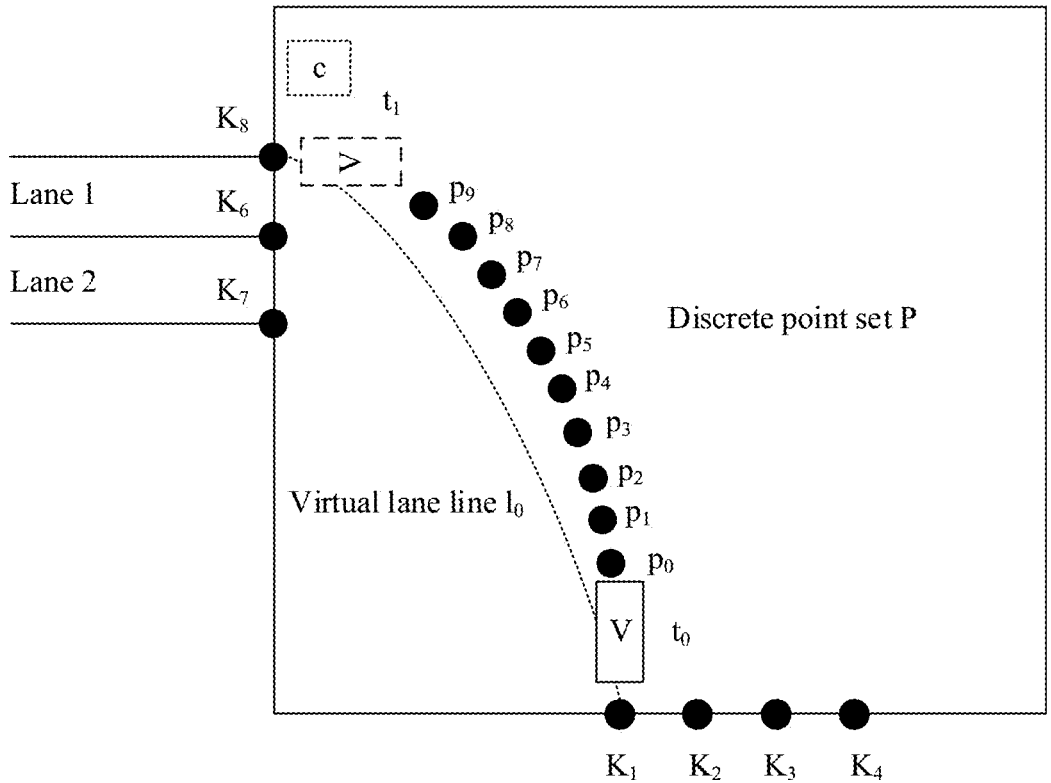
FIG. 13C is a schematic application diagram of a high-definition map in a phase c according to an embodiment of this application.
Figure 14C:
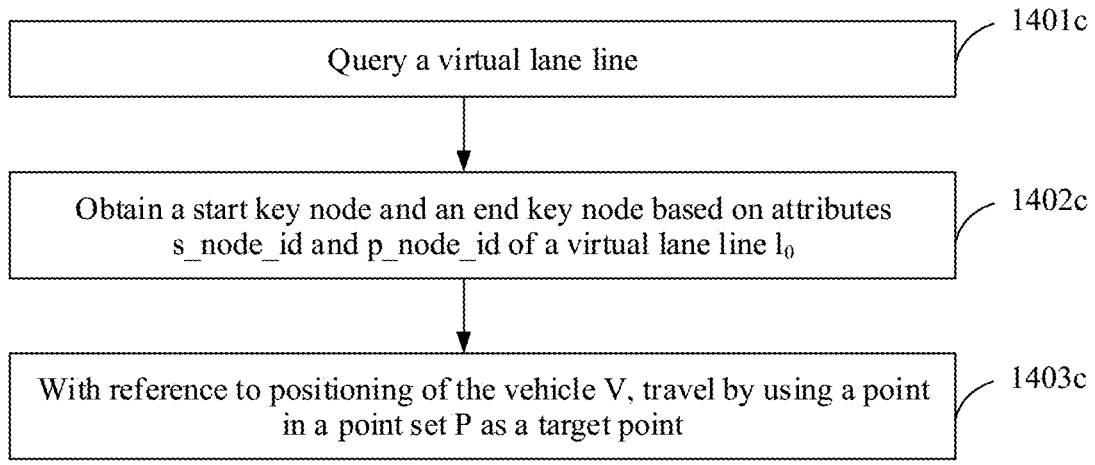
FIG. 14C is a schematic flowchart of a high-definition map application method in a phase c according to an embodiment of this application.

FIG. 13C is a schematic diagram of the vehicle V navigated in the phase c. With reference to FIG. 13C, referring to FIG. 14C, the method for applying a high-definition map to a vehicle is described as follows.

S1401c: At a moment, at which the phase b is left and a phase c is entered, namely, a moment to, based on the route planning intention of the vehicle and an end key node $K_1$ corresponding to a left lane line of a lane in which the vehicle V (the solid-line block) is located before traveling out of the phase b, query the map to obtain a corresponding virtual lane line. For example, as shown in FIG. 13C, the route planning intention of the vehicle is the lane 1 after the vehicle turns left. The high-definition map is queried, and a virtual lane line $l_0$ is obtained based on the key node layer and a virtual lane line layer.

S1402c: Obtain a start key node and an end key node based on attributes s_node_id and p_node_id of a virtual lane line $l_0$.

As shown in FIG. 13C, the start key node is $K_1$, and the end key node is $K_5$. With reference to a spatial coordinate of a control point of the virtual lane line $l_0$, a third-order Bessel curve is generated, and a Bessel curve between a start point and an end point is discretized, to obtain a discrete point set $P=\{p_1, p_2, \ldots, p_9\}$.

S1403c: With reference to positioning of the vehicle V and in combination with a point set P, guide the vehicle V to smoothly pass through an intersection by using a point in the point set P as a target point, to arrive at a vehicle position at a moment ti shown in FIG. 13C, and a next road is entered, and the phase c ends.

In conclusion, a high-definition map application method provided in this embodiment of this application is described. A traveling vehicle is navigated based on the high-definition map designed in this embodiment of this application, and can travel in the middle of the road based on a conventional navigation map layer. Compared with an existing high-definition map, this avoids a complex and redundant navigation operation. Detailed navigation solutions are provided for a lane change scenario and an intersection scenario. The solutions are easy to operate and highly feasible, and have low requirements on positioning. Lane-level navigation precision can be provided to meet a requirement of automatic driving. A vehicle positioning requirement is broken down. Global positioning is used in the S direction, and relative positioning is used in the T direction. The global positioning is coupled with the relative positioning. This helps reduce a requirement on an automatic driving positioning system. In conclusion, compared with the existing high-definition map, the high-definition map provided in this embodiment of this application reduces manufacturing costs and a data scale, and improves precision and navigation accuracy compared with a conventional navigation map.

Figure 15:
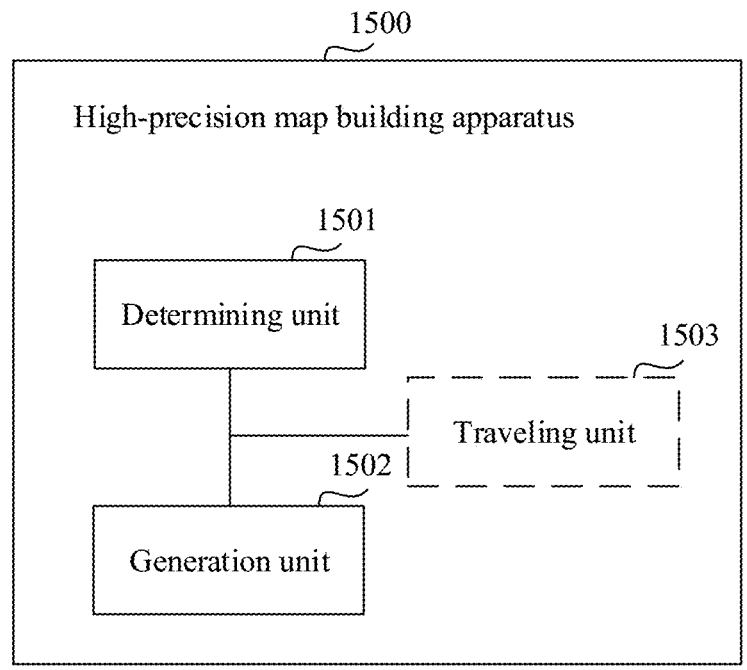
FIG. 15 is a schematic structural diagram 1 of a high-definition map building apparatus according to an embodiment of this application.

Based on a same inventive concept as the foregoing method embodiment, as shown in FIG. 15, an embodiment of this application further provides a high-definition map building apparatus 1500. The high-definition map building apparatus 1500 is configured to perform the method described in the foregoing method embodiment. The high-definition map building apparatus 1500 includes a determining unit 1501 and a generation unit 1502.

The determining unit 1501 is configured to determine a key node.

The key node is used to describe information about a key position of a lane attribute change.

The determining unit 1501 is further configured to determine a key node layer based on a position of the key node and an attribute of the key node.

The generation unit 1502 is configured to determine a high-definition map based on a navigation map and the key node layer.

The navigation map is used to provide road-level navigation information. The high-definition map is used to provide lane-level navigation information.

The determining unit 1501 is further configured to if a lane width change occurs in N consecutive frames of image in frames shot by a vehicle-mounted camera, and N is greater than a first predefined threshold, determine that the key node exists in the N frames of image, and determine a geographic coordinate of the key node.

The determining unit 1501 is further configured to determine a first change value and a second change value for any frame in the N frames, and if a larger value between the first change value and the second change value is greater than a fourth predefined threshold, determine that the lane width change occurs in the any frame of. The first change value is an absolute value of a difference between a first lane width at a first pixel in the any frame and a second lane width at a second pixel in the any frame. The second change value is an absolute value of a difference between the first lane width at the first pixel in the any frame and a third lane width at a first pixel in a previous frame of the any frame.

The high-definition map building apparatus 1500 further includes a traveling unit 1503, configured to determine, based on the high-definition map, a key node that has a mapping relationship with a road on which a vehicle currently travels, and travel based on the key node and a route planning intention.

The key node includes a first key node. The traveling unit 1503 is configured to determine a projected point from the first key node to the road, and travel along a road route based on a distance between a traveling position of the vehicle and the projected point and based on the road-level navigation information provided by the navigation map.

The key node further includes a second key node. The traveling unit 1503 is configured to when the traveling position of the vehicle reaches the projected point, change a lane based on the route planning intention, and travel based on a distance between the traveling position of the vehicle and the second key node.

The key node further includes a third key node. The traveling unit 1503 is configured to when it is determined that the traveling position of the vehicle reaches the second key node, pass through an intersection based on the route planning intention and a virtual lane line. The virtual lane line is determined by the second key node and the third key node.

Division of the units included in the high-definition map building apparatus 1500 is merely an example, division of another unit or module may be further performed, and a name of the unit is also an example. Each unit may further perform various detailed descriptions in the foregoing method embodiment, and repeated descriptions are not described herein again.

Figure 16:
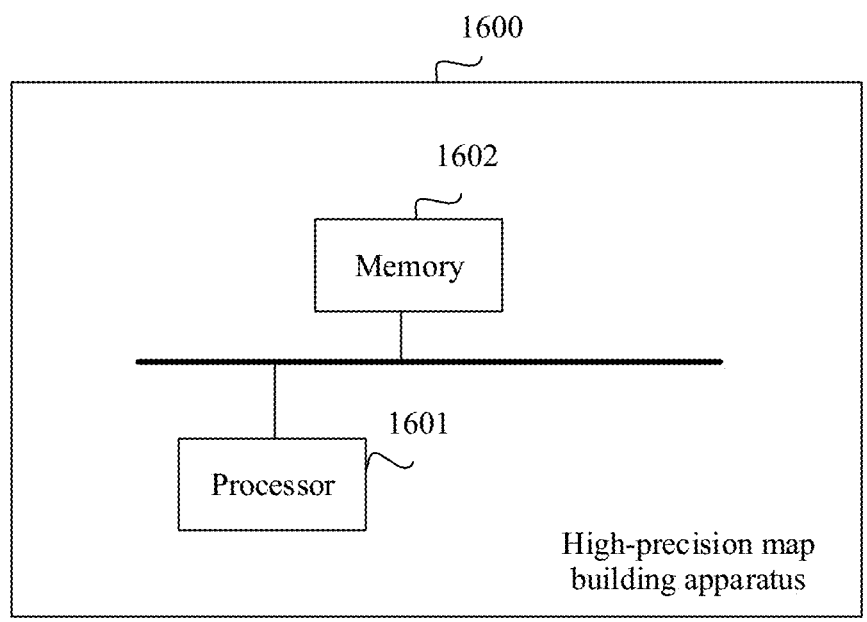
FIG. 16 is a schematic structural diagram 2 of a high-definition map building apparatus according to an embodiment of this application.

Based on a same inventive concept as the foregoing method embodiment, as shown in FIG. 16, an embodiment of this application further provides a high-definition map building apparatus 1600. The high-definition map building apparatus 1600 is configured to perform the method described in the foregoing method embodiment. The high-definition map building apparatus 1600 includes a processor 1601 and a memory 1602. The memory 1602 is configured to store a group of code, and the processor 1601 is configured to invoke the code stored in the memory 1602. When the code is executed, the high-definition map building apparatus 1600 is enabled to perform the method described in the foregoing method embodiment.

The processor 1601 may be a central processing unit (CPU), a network processor (NP), or a combination of the CPU and the NP.

The processor 1601 may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

The memory 1602 may include a volatile memory, for example, a random-access memory (RAM). The memory 1602 may also include a non-volatile memory, for example, a flash memory, a hard disk drive (HDD), or a solid-state drive (SSD). The memory 1602 may further include a combination of the foregoing types of memories.

In one embodiment, in an implementation, the high-definition map building apparatus 1600 may be a chip or an integrated circuit.

An embodiment of this application provides a computer storage medium that stores a computer program. The computer program includes the method provided in the foregoing method embodiment.

An embodiment of this application provides a computer program product including an instruction. When the instruction is run on a computer, the computer is enabled to perform the method provided in the foregoing method embodiment.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD) read-only memory (ROM) (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method for navigating a vehicle that comprises a camera and a computer, wherein the method comprises:
obtaining a plurality of frames;
determining that a key node exists in the plurality of frames when a lane width change continuously occurs in N consecutive frames of the plurality of frames, wherein N is greater than a first predefined threshold;
determining the key node describing information of a key position of a lane attribute change, wherein a type of the key node comprises a lane change point;
determining a geographic coordinate of the key node, wherein the geographic coordinate is a point coordinate value of the key node in a coordinate system of a Global Positioning System (GPS);
determining a key node layer based on the geographic coordinate of the key node and an attribute of the key node;
determining a virtual lane line layer based on the key node layer;
obtaining a high-definition map comprising lane-level navigation information based on a navigation map, the key node layer and the virtual lane line layer, wherein the navigation map comprises road-level navigation information, and wherein the high-definition map is used to provide lane-level navigation information; and
navigating the vehicle based on the high-definition map, wherein the navigating comprises:
determining, based on the high-definition map, a current key node that has a mapping relationship with a road on which the vehicle currently travels, and traveling based on the current key node and a route planning intention;
wherein the current key node comprises a first key node, determining a projected point from the first key node to the road and traveling along a road route based on a distance between a traveling position of the vehicle and the projected point and further based on the road-level navigation information in the navigation map;
wherein the current key node further comprises a second key node, changing a lane based on the route planning intention when the traveling position reaches the projected point and traveling based on a distance between the traveling position and the second key node; and
wherein the current key node further comprises a third key node, identifying that the traveling position reaches the second key node and passing through, in response to the identifying and based on the route planning intention and a virtual lane line, an intersection, wherein the virtual lane line is based on the second key node and the third key node.

2. The method of claim 1, wherein the type of the key node further comprises one or more of lane start and end points or exclusive right-turn lane start and end points.

3. The method of claim 1, wherein the lane change point comprises one or more of a fork point generated when a quantity of lanes increases, a first convergence point generated when the quantity of lanes decreases, a fork junction of an exit lane of a highway, or a second convergence point of an entrance lane of the highway.

4. The method of claim 3, wherein the fork point is at a location where a new lane begins to be formed.

5. The method of claim 4, wherein the location is before the new lane is fully formed.

6. The method of claim 1, wherein a width of a lane with the lane width change is either less than a second predefined threshold in an initial frame of the N consecutive frames or less than a third predefined threshold in an end frame of the N consecutive frames.

7. The method of claim 6, further comprising:
determining a first change value for a frame in the N consecutive frames, wherein the first change value is a first absolute value of a first difference between a first lane width at a first pixel in the frame and a second lane width at a second pixel in the frame;
determining a second change value for the frame, wherein the second change value is a second absolute value of a second difference between the first lane width at the first pixel in the frame and a third lane width at a first pixel in a previous frame of the frame; and determining that the lane width change occurs in the frame when a larger value between the first change value and the second change value is greater than a fourth predefined threshold.

8. The method of claim 1, wherein the attribute comprises one or more of an identifier (ID) of the key node, an ID of a mesh to which the key node is mapped in the navigation map, an ID of a road to which the key node is mapped in the navigation map, a number of a lane in which the key node is located, or a type of the key node.

9. A vehicle comprising:
a memory configured to store programming instructions;
a camera configured to obtain a plurality of frames; and
one or more processors coupled to the memory and the camera, wherein when executed by the one or more processors, the programming instructions cause the vehicle to be configured to:
determine that a key node exists in the plurality of frames when a lane width change continuously occurs in N consecutive frames of the plurality of frames, wherein N is greater than a first predefined threshold;
determine the key node describing information of a key position of a lane attribute change, wherein a type of the key node comprises a lane change point;
determine a geographic coordinate of the key node, wherein the geographic coordinate is a is a point coordinate value of the key node in a coordinate system of a Global Positioning System (GPS);
determine a key node layer based on the geographic coordinate of the key node and an attribute of the key node;
determine a virtual lane line layer based on the key node layer;
build a high-definition map comprising lane-level navigation information based on a navigation map, the key node layer and the virtual lane line layer, wherein the navigation map comprises road-level navigation information, and wherein the high-definition map is used to provide lane-level navigation information; and
navigate the vehicle based on the high-definition map, wherein the navigating comprises:
determining, based on the high-definition map, a current key node that has a mapping relationship with a road on which the vehicle currently travels, and traveling based on the current key node and a route planning intention;
wherein the current key node comprises a first key node, determining a projected point from the first key node to the road and traveling along a road route based on a distance between a traveling position of the vehicle and the projected point and further based on the road-level navigation information in the navigation map;
wherein the current key node further comprises a second key node, changing a lane based on the route planning intention when the traveling position reaches the projected point and traveling based on a distance between the traveling position and the second key node; and
wherein the current key node further comprises a third key node, identifying that the traveling position reaches the second key node and passing through, in response to the identifying and based on the route planning intention and a virtual lane line, an intersection, wherein the virtual lane line is based on the second key node and the third key node.

10. The vehicle of claim 9, wherein the type of the key node further comprises one or more of lane start and end points or exclusive right-turn lane start and end points, and wherein the lane change point comprises one or more of a fork point generated when a quantity of lanes increases, a first convergence point generated when the quantity of lanes decreases, a fork junction of an exit lane of a highway, or a second convergence point of an entrance lane of the highway.

11. The vehicle of claim 10, wherein the fork point is located where a new lane begins to be formed.

12. The vehicle of claim 9, wherein a width of a lane with the lane width change is either less than a second predefined threshold in an initial frame in the N consecutive frames or less than a third predefined threshold in an end frame in the N consecutive frames.

13. The vehicle of claim 9, wherein the programming instructions further cause the vehicle to be configured to:
determine a first change value for a frame in the N consecutive frames, wherein the first change value is a first absolute value of a first difference between a first lane width at a first pixel in the frame and a second lane width at a second pixel in the frame;
determine a second change value for the frame, wherein the second change value is a second absolute value of a second difference between the first lane width at the first pixel in the frame and a third lane width at a first pixel in a previous frame of the frame; and
determine that the lane width change occurs in the frame when a larger value between the first change value and the second change value is greater than a fourth predefined threshold.

14. The vehicle of claim 9, wherein the attribute comprises one or more of an identifier (ID) of the key node, an ID of a mesh to which the key node is mapped in the navigation map, an ID of a road to which the key node is mapped in the navigation map, a number of a lane in which the key node is located, or a type of the key node.

15. A computer program product comprising computer-executable instructions for storage on a non-transitory computer-readable medium that, when executed by one or more processors, cause an apparatus to:
determine that a key node exists in plurality of frames when a lane width change continuously occurs in N consecutive frames of the plurality of frames, wherein N is greater than a first predefined threshold;
determine the key node describing information of a key position of a lane attribute change, wherein a type of the key node comprises a lane change point;
determine a geographic coordinate of the key node, wherein the geographic coordinate is a is a point coordinate value of the key node in a coordinate system of a Global Positioning System (GPS);
determine a key node layer based on the geographic coordinate of the key node and an attribute of the key node;
determine a virtual lane line layer based on the key node layer;
build a high-definition map comprising lane-level navigation information based on a navigation map, the key node layer and the virtual lane line layer, wherein the navigation map comprises road-level navigation information, and wherein the high-definition map is used to provide lane-level navigation information; and navigate a vehicle based on the high-definition map, wherein the navigating comprises causing the apparatus to:

determine, based on the high-definition map, a current key node that has a mapping relationship with a road on which the vehicle currently travels, and travel based on the current key node and a route planning intention;

wherein the current key node comprises a first key node, determine a projected point from the first key node to the road and traveling along a road route based on a distance between a traveling position of the vehicle and the projected point and further based on the road-level navigation information in the navigation map;

wherein the current key node further comprises a second key node, change a lane based on the route planning intention when the traveling position reaches the projected point and travel based on a distance between the traveling position and the second key node; and wherein the current key node further comprises a third key node, identify that the traveling position reaches the second key node and passing through, in response to the identifying and based on the route planning intention and a virtual lane line, an intersection, wherein the virtual lane line is based on the second key node and the third key node.

16. The computer program product of claim 15, wherein the type of the key node further comprises one or more of lane start and end points or exclusive right-turn lane start and end points.

17. The computer program product of claim 15, wherein the lane change point comprises one or more of a fork point generated when a quantity of lanes increases, a first convergence point generated when the quantity of lanes decreases, a fork junction of an exit lane of a highway, or a second convergence point of an entrance lane of the highway.

18. The computer program product of claim 15, wherein a width of a lane with the lane width change is either less than a second predefined threshold in an initial frame of the N consecutive frames or less than a third predefined threshold in an end frame of the N consecutive frames.

19. The computer program product of claim 18, wherein the instructions further cause the apparatus to:

determine a first change value for a frame in the N consecutive frames, wherein the first change value is a first absolute value of a first difference between a first lane width at a first pixel in the frame and a second lane width at a second pixel in the frame;

determine a second change value for the frame, wherein the second change value is a second absolute value of a second difference between the first lane width at the first pixel in the frame and a third lane width at a first pixel in a previous frame of the frame; and determine that the lane width change occurs in the frame when a larger value between the first change value and the second change value is greater than a fourth predefined threshold.

20. The computer program product of claim 18, wherein the attribute comprises one or more of an identifier (ID) of the key node, an ID of a mesh to which the key node is mapped in the navigation map, an ID of a road to which the key node is mapped in the navigation map, a number of a lane in which the key node is located, or a type of the key node.

* * * * *

UNITED STATES PATENT AND TRADEMARK OFFICE
CERTIFICATE OF CORRECTION

| | | |
|---|---|---|
| PATENT NO. | : 11,933,627 B2 | Page 1 of 1 |
| APPLICATION NO. | : 17/334076 | |
| DATED | : March 19, 2024 | |
| INVENTOR(S) | : Jiong Deng et al. | |

It is certified that error appears in the above-identified patent and that said Letters Patent is hereby corrected as shown below:

On the Title Page

Page 2, (56) References Cited, Foreign Patent Documents: "IN 101436074 A 5/2009" should read "CN 101436074 A 5/2009"

Signed and Sealed this
Thirtieth Day of April, 2024

Katherine Kelly Vidal
*Director of the United States Patent and Trademark Office*